United States Patent
Paris et al.

(10) Patent No.: US 12,231,785 B2
(45) Date of Patent: *Feb. 18, 2025

(54) SYSTEMS AND METHODS FOR MULTISPECTRAL LANDSCAPE MAPPING

(71) Applicant: LandScan LLC, San Luis Obispo, CA (US)

(72) Inventors: Jack F. Paris, Clovis, CA (US); Michael J. Unverferth, Raymond, NE (US); Mark Hull, Exeter, CA (US); Robert S. Horton, Colchester, VT (US); Stephen P. Farrington, Gaysville, VT (US); Daniel James Rooney, Lake Oswego, OR (US)

(73) Assignee: LandScan LLC, Davis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,547

(22) Filed: Oct. 23, 2023

(65) Prior Publication Data

US 2024/0056693 A1  Feb. 15, 2024

Related U.S. Application Data

(63) Continuation of application No. 17/832,964, filed on Jun. 6, 2022, now Pat. No. 11,800,246, which is a
(Continued)

(51) Int. Cl.
*H04N 25/131* (2023.01)
*G01C 11/02* (2006.01)
(Continued)

(52) U.S. Cl.
CPC .......... *H04N 25/131* (2023.01); *G01C 11/02* (2013.01); *G06T 3/4038* (2013.01); *G06T 7/33* (2017.01);
(Continued)

(58) Field of Classification Search
None
See application file for complete search history.

(56) References Cited

U.S. PATENT DOCUMENTS

| 3,971,065 A | 7/1976 | Bayer |
| 5,596,494 A | 1/1997 | Kuo |

(Continued)

FOREIGN PATENT DOCUMENTS

| CN | 102063710 B | 1/2013 |
| CN | 103839955 B | 5/2016 |

(Continued)

OTHER PUBLICATIONS

MAPIR Kernel2 Cameras: Modular Array Cameras. https://www.mapir.camera/pages/kernel2-array-cameras (last viewed on Jan. 13, 2022).

(Continued)

*Primary Examiner* — Frank S Chen
(74) *Attorney, Agent, or Firm* — Downs Rachlin Martin PLLC

(57) ABSTRACT

Image acquisition and analysis systems for efficiently generating high resolution geo-referenced spectral imagery of a region of interest. In some examples, aerial spectral imaging systems for remote sensing of a geographic region, such as a vegetative landscape are disclosed for monitoring the development and health of the vegetative landscape. In some examples photogrammetry processes are applied to a first set of image frames captured with a first image sensor having a first field of view to generate external orientation data and surface elevation data and the generated external orientation data is translated into external orientation data for other image sensors co-located on the same apparatus for generating geo-referenced images of images captured by the one or more other image sensors.

20 Claims, 11 Drawing Sheets

Related U.S. Application Data continuation of application No. PCT/US2022/070450, filed on Feb. 1, 2022.

(51) Int. Cl.
  *G06T 3/4038*    (2024.01)
  *G06T 7/33*      (2017.01)
  *G06T 7/70*      (2017.01)
  *G06T 17/05*     (2011.01)
  *H04N 23/55*     (2023.01)
  *H04N 23/698*    (2023.01)
  *H04N 23/90*     (2023.01)

(52) U.S. Cl.
  CPC ............... *G06T 7/70* (2017.01); *G06T 17/05* (2013.01); *H04N 23/55* (2023.01); *H04N 23/698* (2023.01); *H04N 23/90* (2023.01); *G06T 2207/10036* (2013.01); *G06T 2207/10041* (2013.01); *G06T 2207/30244* (2013.01)

(56) References Cited

U.S. PATENT DOCUMENTS

| | | |
|---|---|---|
| 6,611,289 B1 | 8/2003 | Yu et al. |
| 6,664,529 B2 | 12/2003 | Pack et al. |
| 7,149,366 B1 | 12/2006 | Sun |
| 7,187,452 B2 | 3/2007 | Jupp et al. |
| 7,340,099 B2 | 3/2008 | Zhang |
| 7,936,949 B2 | 5/2011 | Riley et al. |
| 8,564,865 B2 | 10/2013 | Klug et al. |
| 8,896,695 B2 | 11/2014 | Peters et al. |
| 8,929,645 B2 | 1/2015 | Coffman |
| 8,941,678 B2 | 1/2015 | Kurtz et al. |
| 8,964,298 B2 | 2/2015 | Haddick et al. |
| 9,134,178 B2 | 9/2015 | Kurtz et al. |
| 9,140,607 B2 | 9/2015 | Maier et al. |
| 9,204,038 B2 | 12/2015 | Lord et al. |
| 9,225,889 B1 | 12/2015 | Korkin |
| 9,275,267 B2 | 3/2016 | Verret |
| 9,442,012 B2 | 9/2016 | Mann et al. |
| 9,639,756 B2 | 5/2017 | Abileah |
| 9,654,704 B2 | 5/2017 | Holliday |
| 9,692,984 B2 | 6/2017 | Lord |
| 9,726,487 B2 | 8/2017 | Biesemans et al. |
| 9,797,980 B2 | 10/2017 | Smitherman |
| 9,798,928 B2 | 10/2017 | Carr et al. |
| 9,843,787 B2 | 12/2017 | Georgiev et al. |
| 9,898,688 B2 | 2/2018 | Bleiweiss |
| 9,948,914 B1 | 4/2018 | Pinkus et al. |
| 9,952,388 B2 | 4/2018 | Andle et al. |
| 10,043,292 B2 | 8/2018 | Edgar et al. |
| 10,054,438 B2 | 8/2018 | Michiels et al. |
| 10,126,722 B2 | 11/2018 | Sweet et al. |
| 10,180,572 B2 | 1/2019 | Osterhout et al. |
| 10,222,265 B2 | 3/2019 | Chan et al. |
| 10,266,263 B2 | 4/2019 | Zhang et al. |
| 10,297,703 B2 | 5/2019 | Tian et al. |
| 10,303,185 B2 | 5/2019 | Zhang et al. |
| 10,319,050 B2 | 6/2019 | Richt |
| 10,409,276 B2 | 9/2019 | Wang et al. |
| 10,434,573 B2 | 10/2019 | Buller et al. |
| 10,495,884 B2 | 12/2019 | Benesh et al. |
| 10,565,789 B2 | 2/2020 | Livens et al. |
| 10,571,932 B2 | 2/2020 | DeBitetto et al. |
| 10,574,911 B2 | 2/2020 | Dvir |
| 10,585,441 B2 | 3/2020 | Qin et al. |
| 10,684,137 B2 | 6/2020 | Kean |
| 10,704,958 B2 | 7/2020 | Zombo et al. |
| 10,706,551 B2 | 7/2020 | Mcardle et al. |
| 10,735,632 B2 | 8/2020 | Ramseyer |
| 10,769,456 B2 | 9/2020 | Sathyanarayana et al. |
| 10,803,313 B2 | 10/2020 | Ritter et al. |
| 10,824,149 B2 | 11/2020 | Wang et al. |
| 10,845,187 B2 | 11/2020 | Kontsos et al. |
| 10,891,527 B2 | 1/2021 | Liu et al. |
| 10,901,437 B2 | 2/2021 | Zhang et al. |
| 10,922,957 B2 | 2/2021 | Rhoads et al. |
| 10,977,734 B1 | 4/2021 | Kenney |
| 10,979,615 B2 | 4/2021 | Wang et al. |
| 11,006,856 B2 | 5/2021 | Kikkeri |
| 11,023,751 B2 | 6/2021 | Heck et al. |
| 11,040,444 B2 | 6/2021 | Cristache |
| 11,044,446 B2 | 6/2021 | Sugizaki |
| 2003/0066932 A1 | 4/2003 | Carroll |
| 2011/0282578 A1* | 11/2011 | Miksa ............... G06F 16/29 |
| | | 701/532 |
| 2012/0114229 A1* | 5/2012 | Zhou ............... G01C 11/025 |
| | | 382/164 |
| 2012/0293669 A1 | 11/2012 | Mann |
| 2015/0078507 A1* | 3/2015 | Kyriakou ............ A61B 6/5258 |
| | | 382/130 |
| 2016/0070356 A1 | 3/2016 | Aguirre et al. |
| 2016/0150142 A1 | 5/2016 | Lapstun et al. |
| 2016/0205385 A1 | 7/2016 | Sibley |
| 2016/0292626 A1 | 10/2016 | Green |
| 2017/0083103 A1 | 3/2017 | Chen |
| 2017/0085806 A1 | 3/2017 | Richards |
| 2017/0127606 A1 | 5/2017 | Horton |
| 2017/0277951 A1 | 9/2017 | Wagner et al. |
| 2018/0273173 A1 | 9/2018 | Moura |
| 2018/0286052 A1 | 10/2018 | Mcardle et al. |
| 2019/0094344 A1 | 3/2019 | Steinmann et al. |
| 2019/0188471 A1 | 6/2019 | Osterhout et al. |
| 2019/0265694 A1 | 8/2019 | Chen et al. |
| 2019/0291277 A1 | 9/2019 | Oleynik |
| 2019/0293848 A1 | 9/2019 | Morimitsu |
| 2020/0066405 A1 | 2/2020 | Peyman |
| 2020/0134783 A1 | 4/2020 | Mori et al. |
| 2020/0182697 A1 | 6/2020 | Peleg et al. |
| 2020/0184153 A1 | 6/2020 | Bongartz et al. |
| 2020/0192089 A1 | 6/2020 | Haddick et al. |
| 2020/0272144 A1 | 8/2020 | Yang et al. |
| 2020/0380283 A1 | 12/2020 | Georgy |
| 2020/0380703 A1 | 12/2020 | Liu |
| 2021/0000006 A1 | 1/2021 | Ellaboudy et al. |
| 2021/0007287 A1 | 1/2021 | Alexander et al. |
| 2021/0024081 A1 | 1/2021 | Johnson-Roberson et al. |
| 2021/0058591 A1 | 2/2021 | Takashima et al. |
| 2021/0064987 A1 | 3/2021 | Springer et al. |
| 2021/0171228 A1 | 6/2021 | Almogy et al. |
| 2021/0173396 A1 | 6/2021 | Zhang |
| 2021/0173480 A1 | 6/2021 | Osterhout et al. |
| 2021/0181020 A1 | 6/2021 | McQuilkin et al. |
| 2021/0191019 A1 | 6/2021 | Toda |
| 2022/0012511 A1 | 1/2022 | Rowe |

FOREIGN PATENT DOCUMENTS

| | | |
|---|---|---|
| CN | 104112263 B | 5/2018 |
| CN | 108875659 A | 11/2018 |
| CN | 109564706 A | 4/2019 |
| CN | 109684929 A | 4/2019 |
| CN | 103946732 B | 6/2019 |
| CN | 110136219 A | 8/2019 |
| CN | 110428387 A | 11/2019 |
| CN | 110827415 A | 2/2020 |
| CN | 110891862 A | 3/2020 |
| CN | 110997488 A | 4/2020 |
| CN | 110687902 B | 10/2020 |
| CN | 111788602 A | 10/2020 |
| CN | 112393714 A | 2/2021 |
| CN | 112529781 A | 3/2021 |
| CN | 112669363 A | 4/2021 |
| CN | 112906719 A | 6/2021 |
| CN | 110733624 B | 9/2021 |
| CN | 111602384 B | 11/2021 |
| DE | 10047285 B2 | 4/2002 |
| EP | 0908060 A1 | 4/1999 |
| EP | 1973463 A1 | 10/2008 |
| EP | 2702375 A2 | 3/2014 |
| EP | 2330435 B1 | 9/2015 |
| EP | 1508020 B2 | 3/2017 |

(56) References Cited

FOREIGN PATENT DOCUMENTS

| | | |
|---|---|---|
| EP | 3345129 A1 | 7/2018 |
| EP | 3158396 B1 | 3/2019 |
| EP | 3827226 A1 | 6/2021 |
| ES | 2734725 A1 | 12/2019 |
| JP | 5676975 B2 | 2/2015 |
| KR | 10-1150510 B1 | 5/2012 |
| KR | 10-2152720 B1 | 9/2020 |
| KR | 10-2160687 B1 | 9/2020 |
| KR | 10-2181283 B1 | 11/2020 |
| NO | 2020093497 A1 | 5/2020 |
| WO | 2011054040 A1 | 5/2011 |
| WO | 2012037290 A3 | 7/2012 |
| WO | 2017187276 A2 | 11/2017 |
| WO | 2019213708 A1 | 11/2019 |
| WO | 2021119363 A2 | 6/2021 |

OTHER PUBLICATIONS

Wang Sheng et al., "Unmanned Aerial System Multispectral Mapping For Low and Variable Solar Irradiance Conditions: Potential of Tensor Decomposition." ISPRS Journal of Photogrammetry and Remote Sensing, Amsterdam, vol. 155, pp. 58-71 (Jul. 4, 2019).
International Search Report and Written Opinion dated Nov. 22, 2022, in connection with PCT/US2022/070450 filed on Feb. 1, 2022.

* cited by examiner

SYSTEMS AND METHODS FOR MULTISPECTRAL LANDSCAPE MAPPING

RELATED APPLICATION DATA

This application is a continuation of U.S. patent application Ser. No. 17/832,964, filed on Jun. 6, 2022, and which application was a continuation of PCT/US2022/070450, filed on Feb. 1, 2022, and titled "Systems and Methods for Multispectral Landscape Mapping". Each application is incorporated by reference herein in its entirety.

FIELD

The present disclosure relates generally to remote sensing and photogrammetry, and in particular relates to systems and methods for multispectral landscape mapping.

BACKGROUND

Aerial remote sensing can be used to characterize and monitor a landscape. By way of example, aerial remote sensing can be used to characterize and monitor a terrestrial vegetative landscape in agricultural applications by capturing and processing spectral images of the landscape. Photosynthetic organisms generally absorb light in the photosynthetically-active radiation wavelength range of 700 nm to 400 nm and reflect other wavelength ranges, including near infrared (NIR). Metrics such as the well-known Normalized Difference Vegetation Index (NDVI) can be used to assess the relative proportion of reflected visible and NIR light to assess plant health. Multispectral imagery can also be used to detect pests. Remote spectral imaging can, therefore, be used to monitor large areas of land to provide early detection of problems and feedback for agricultural management programs. Aerial remote sensing can also be used to take measurements of any other type of terrestrial or extraterrestrial landscape, with the instrumentation and data processing varying according to a particular application.

SUMMARY

In one implementation, the present disclosure is directed to a non-transitory computer-readable storage medium containing machine-executable instructions for performing a method of generating geo-referenced spectral images of a landscape from a first plurality of images captured by a first image sensor of an aerial platform and a plurality of spectral images captured by a multispectral (MS) image sensor of the aerial platform. The method includes performing an aerial triangulation and bundle adjustment process on the first plurality of images to determine first image sensor external orientation (EO) data, the first image sensor EO data defining the EO of the first image sensor when each of the first plurality of images was captured by the first image sensor; generating a digital elevation product from the plurality of first images and the first image sensor EO data; and orthorectifying at least one of the plurality of spectral images according to the digital elevation product.

In another implementation, the present disclosure is directed to a non-transitory computer-readable storage medium containing machine-executable instructions for performing a method of generating a flight plan that includes a flight path and a series of image capture locations for an aerial system, wherein the aerial imaging system includes a first downward-looking camera that is a panchromatic camera and at least one second downward-looking camera that includes a multispectral camera, wherein the field of view of the first camera has a cross-sectional area between at least 50% greater than and at least 100% greater than a cross-section area of the field of view of the second camera, wherein the field of view of the second camera is approximately centered within the field of view of the first camera, and wherein the first and second cameras are triggered at substantially the same time and have substantially the same frame rate such that multispectral digital images of a given portion of the landscape taken by the second (multispectral) camera each reside within a panchromatic digital image of the corresponding portion of the landscape taken by the first camera. The method of generating the flight plan includes ensuring a sufficient number of images are captured so that a continuous map of the landscape can be generated and so that the image capture locations result in an overlap of adjacent images, including a longitudinal overlap in the flight path direction and a lateral overlap in the lateral direction; wherein: the lateral overlap of adjacent panchromatic images is in the range of approximately 30% to approximately 90% and the lateral overlap of adjacent multispectral images is in the range of approximately −20% to approximately 50%; and the longitudinal overlap of adjacent panchromatic images is in the range of approximately 30% to greater than 70% and the longitudinal overlap of adjacent multispectral images is in the range of approximately −20% to approximately less than 50%.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Aspects of the present disclosure include image acquisition and analysis systems for efficiently generating high resolution geo-referenced spectral imagery of a region of interest. In some examples, aerial spectral imaging systems for remote sensing of a geographic region, such as a vegetative landscape are disclosed for monitoring the development and health of the vegetative landscape, such as crops or forest canopy. Systems disclosed herein may be used, for example, for the detection of the chemical composition of plants, early detection of disease outbreaks, monitoring of impact of pollution and other environmental factors, or for monitoring the effectiveness of and adjustment to a nutrition and irrigation program for growing and maintaining the vegetative landscape, among other applications.

In some examples photogrammetry processes are applied to a first set of image frames captured with a first image sensor having a first field of view to generate external orientation data and surface elevation data and the generated external orientation data is translated into external orientation data for other image sensors co-located on the same apparatus. Geo-referenced images may then be generated from the images captured by the one or more other image sensors without requiring a full photogrammetry calculation process, including for, example, without needing to calculate external orientation data or surface elevation data directly from the images captured by the one or more other image sensors.

Figure 1:
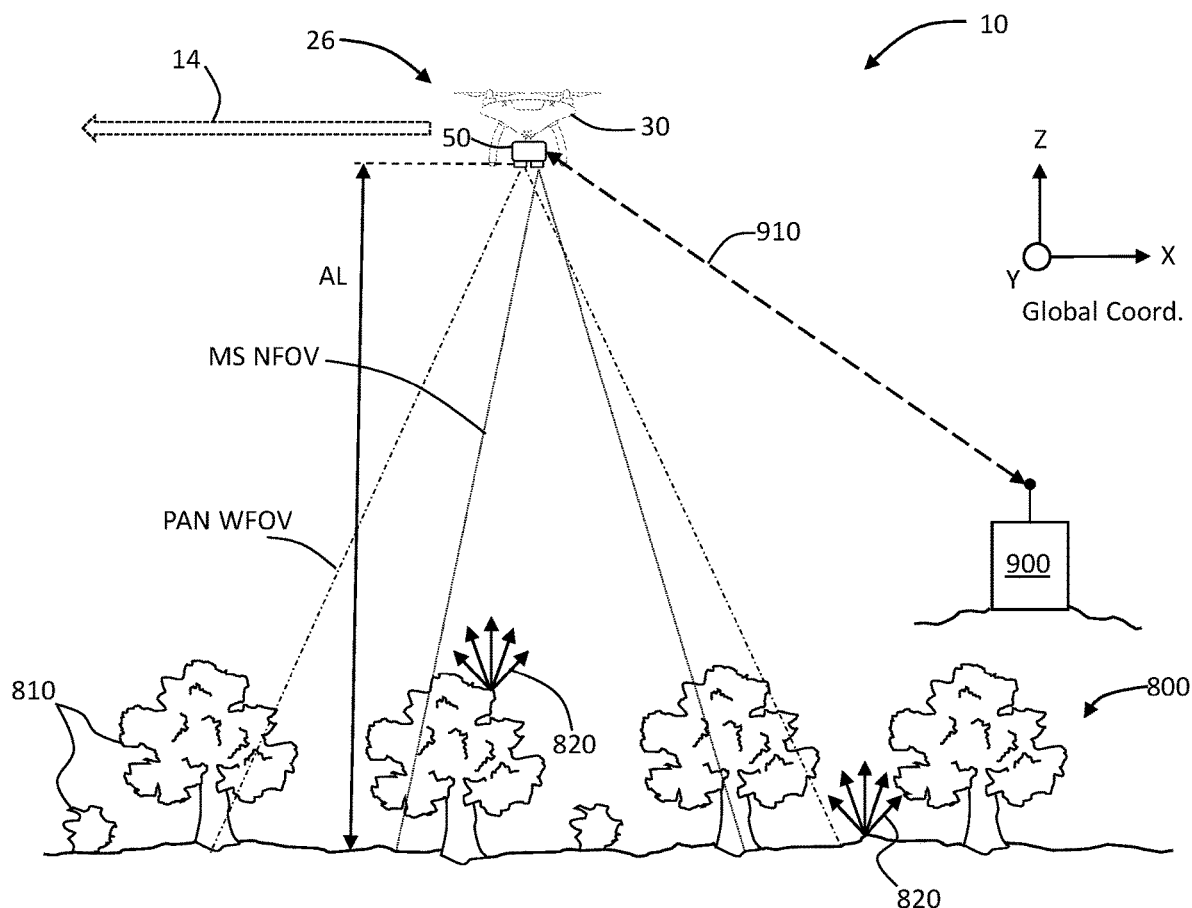
FIG. 1 is a schematic diagram of an example implementation of a spectral imaging system in use imaging an example landscape.

FIG. 1 is a schematic diagram of one example implementation of a spectral imaging system 10 made in accordance with the present disclosure. System 10 is shown relative to an example vegetative landscape 800 that includes vegetation 810. The vegetation 810 can be any type of vegetation, including any type of agricultural vegetation (also referred to herein as crops), forest canopy, native plant vegetation, etc. At least a portion of light 820 from the landscape 800 is broadband light, meaning that it has a spectral bandwidth that ranges from the ultraviolet into the infrared. Some of the light 820 is reflected light while some of the light is radiated light (e.g., at infrared wavelengths). Some of the light 820 can be narrower than broadband due to the selective absorption of ambient light. Vegetative landscape 800 is provided by way of example, however, the systems and methods of the present disclosures may be utilized by persons having ordinary skill in the art for remote sensing of any type of landscape, such as any type of terrestrial landscape, including, by way of example, soil, water (including oceans, lakes, estuaries, streams, rivers, inland seas, wetlands, etc.), coastal, urban, suburban, rural, industrial (e.g., mines, landfills, etc.), glaciers, ice sheets, etc., as well as remote sensing of analogous or other extraterrestrial landscapes now know or later discovered.

Figure 2:
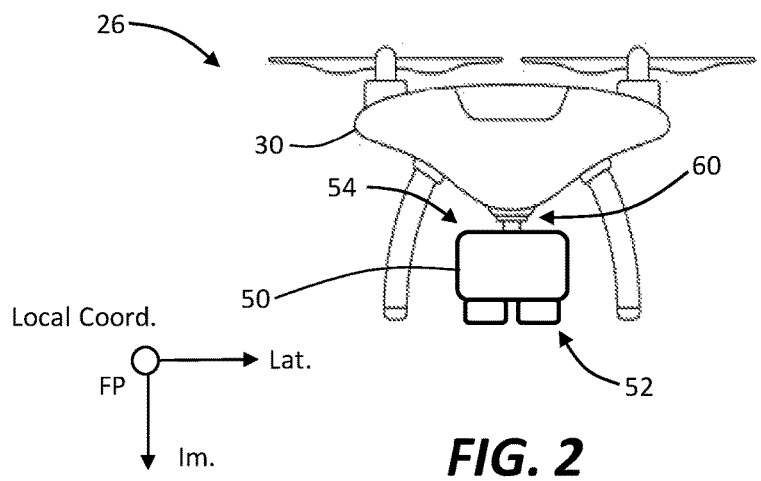
FIG. 2 is a front elevation view of an aerial imaging system of the spectral imaging system of FIG. 1, including an aerial platform and a camera rig operably supported by the aerial platform.

Referring to FIGS. 1 and 2, system 10 includes an aerial imaging system 26 comprising an aerial vehicle 30 and a camera rig 50 having an image capture side 52 and a back side 54 opposite the image capture side. In the illustrated example, aerial vehicle 30 is an unmanned drone. In other example implementations, any type of aerial vehicle (including both manned and unmanned) such as helicopters, fixed-wing aircraft, etc. may be employed. Aerial imaging system 26 also includes a stabilizer 60 coupled to an underside of the aerial vehicle 30 for operably supporting the camera rig 50 in a stabilized manner. An example stabilizer 60 comprises a gimbaled mount such as those known and used in drone-based imaging technology. Example configurations of the camera rig 50 are discussed in detail below.

Referring to FIG. 1, system 10 also includes a ground control station 900 for controlling the aerial imaging system 26. In one example, ground control station 900 is configured to wirelessly communicate or exchange information such as data and signals with aerial imaging system 26 via a wireless communication link 910 over which data, such as flight plan information, image data, and telemetry data may be communicated. In another example, most or all data is transmitted between the ground control station 900 and the aerial imaging system 26 before and after a flight while the aerial imaging system is on the ground by wired or wireless transmission and/or by removeable storage media.

In use, aerial imaging system 26 may be configured to take a series of images of a landscape, such as landscape 800 as the system flies over the landscape. In some implementations, aerial imaging system 26 may be used to collect a series of images of the landscape that are then transmitted to a computing system and processed using photogrammetry software to form a digital map of the area by combining the series of images into a mosaic using photogrammetry techniques disclosed herein. Aerial imaging system 26 may be flown over the landscape according to a flight plan that ensures a sufficient number of images are captured so that a continuous map of the landscape can be generated.

Figure 3:
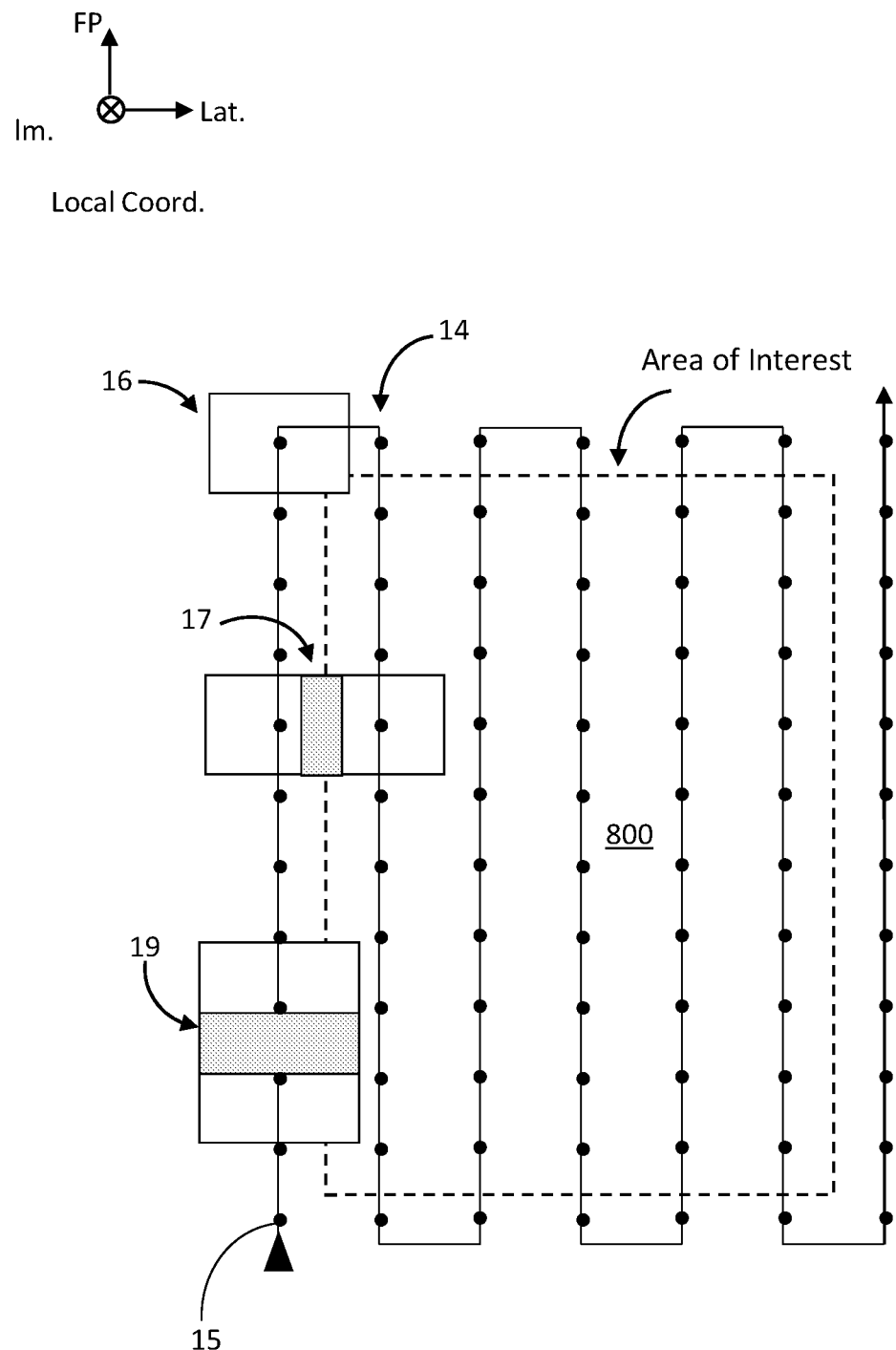
FIG. 3 is a schematic diagram of an example flight path over which an aerial imaging system may travel to collect sensor data of an area of interest.

FIG. 3 illustrates one example of a flight path 14 over landscape 800 that may be specified by a particular flight plan for capturing images of the landscape, where the flight path may be specified by a speed, altitude, and series of latitude and longitude values. The flight path 14 can have any given pattern (e.g., raster, U-shaped, back-and-forth, etc.) known in the art of aerial mapping and useful for mapping a select region of the landscape, as discussed in greater detail below. Aerial imaging system 26 may be preprogrammed to perform flight path 14 by defining a flight plan with ground control software and/or can be controlled in real time to move along a flight path by the ground control station 900 via the wireless communication link 910 as is known in the art.

FIG. 3 conceptually illustrates a series of image capture locations 15 (only one labeled) where aerial imaging system 26 captures at least one image of a portion of the landscape 800 below the aerial imaging system. Aerial imaging system 26 is configured to move in a flight path direction, FP, along the flight path 14 with the camera rig 50 oriented in an imaging direction Im., and sequentially capture at least one two-dimensional image with a sensing system of the camera rig at each image capture location 15. FIG. 3 illustrates a field of view (FOV) 16 of an image sensor of the camera rig.

The image capture locations may be designed, selected, and configured to result in an overlap of adjacent images, including a longitudinal overlap 19 in the flight path direction and a lateral overlap 17 in the lateral direction.

Figure 4:
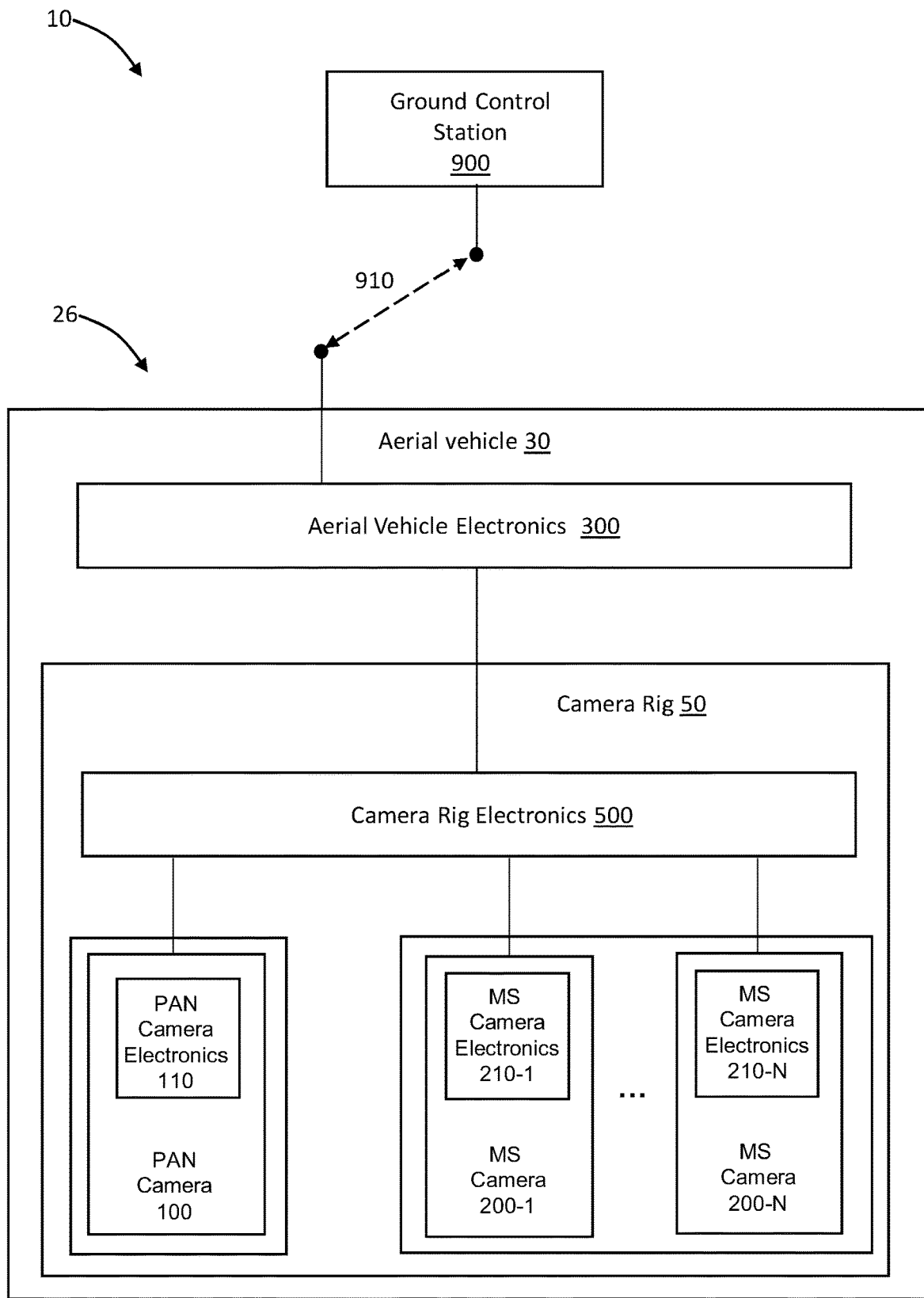
FIG. 4 is a functional block diagram illustrating certain components of the spectral imaging system of FIG. 1.

FIG. 4 is schematic diagram of certain components of the example system 10 disclosed herein. In the illustrated example, aerial imaging system 26 includes aerial vehicle electronics 300 operably supported in the aerial vehicle 30 and in one example, electrically connected to camera rig electronics 500, which are operably supported in the camera rig 50 (as shown) or some other convenient location. Camera rig 50 includes a plurality of image sensors. In the illustrated example, the image sensors include a panchromatic (PAN) camera 100 for capturing two dimensional panchromatic images (PAN images) of a scene and a plurality of spectral sensors, here multispectral (MS) cameras 200 for capturing two dimensional multispectral images MS images) of a scene. As described more below, by incorporating both a PAN camera and a MS camera on the same aerial imaging system 26, the respective images captured by the cameras can be more readily co-registered both spatially and temporally which can be beneficial for augmenting or processing any of the images with information obtained from other ones of the images.

Aerial vehicle electronics 300 are configured to control the operation of the aerial vehicle 30 and to communicate with the ground station 900 over the wireless communication link 910. Camera rig electronics 500 are configured to control the operation of the camera rig 50 taking into account flight information about the aerial imaging system 26 as it travels over the flight path 14. In some examples the flight information is provided to the camera rig electronics 500 by the aerial vehicle electronics 300 while in other examples the flight information is provided to the camera rig electronics 500 by the ground control station and/or independently determined by the camera rig electronics.

Figure 5:
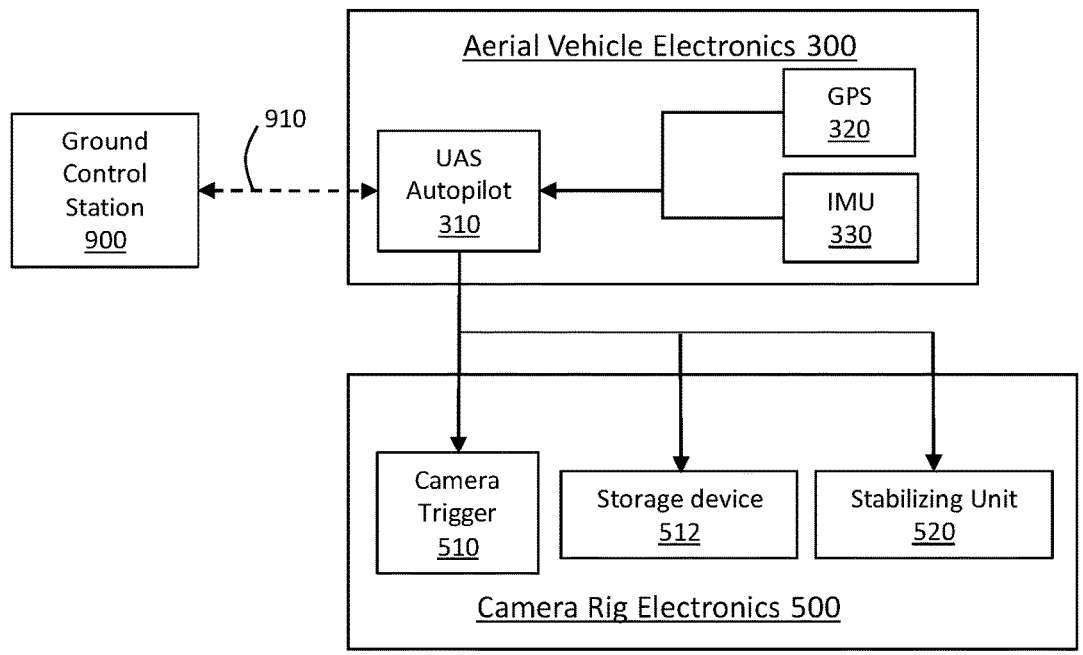
FIG. 5 is functional block diagram of an example configuration of aerial vehicle electronics and camera rig electronics.

FIG. 5 is a schematic diagram of an example configuration of the aerial vehicle electronics 300 and the camera rig electronics 500. The aerial vehicle electronics 300 can include any of the electronic components typically included in a manned or unmanned aircraft to control the aircraft. In the illustrated example, the electronics include an unmanned aircraft system (UAS) autopilot 310 electrically connected to a global positioning system (GPS) 320 and an inertial measurement unit (IMU) 330.

The camera rig electronics 500 may similarly include any electronic component typically utilized in imaging systems, including imaging systems specifically designed for aircraft, such as a camera trigger 510 and a stabilizing unit 520. In the illustrated example, the camera rig electronics 500 are electrically connected to the UAS autopilot 310 in order to receive flight information (e.g., latitude, longitude, roll, pitch, yaw, speed over ground, altitude, etc.) of the aerial imaging system 26 at is moves over a flight path, such as flight path 14 (see FIG. 3). The camera trigger 510 provides trigger signals for triggering sensing devices of the camera rig, such as PAN camera 100 and MS cameras 200, for capturing respective two-dimensional image frames. The captured images may be stored in storage device 512 along with location information obtained from aerial vehicle electronics 300 at the time the images are taken. Aerial imaging system 26 may also include a separate camera triggering and geotagging device (not illustrated) that is operably coupled to the aerial vehicle electronics 300 and the camera rig electronics 500 for sending triggering signals to camera trigger 510 and providing location information for storing in, e.g., in storage device 512, for recording the approximate global coordinate locations where each image stored in memory is taken. The stabilizing unit 520 is operably connected to and controls (stabilizes) the stabilizer 60. The stabilizer 60 operably supports the camera rig 50 in a stabilized downward-looking orientation.

Figure 6:
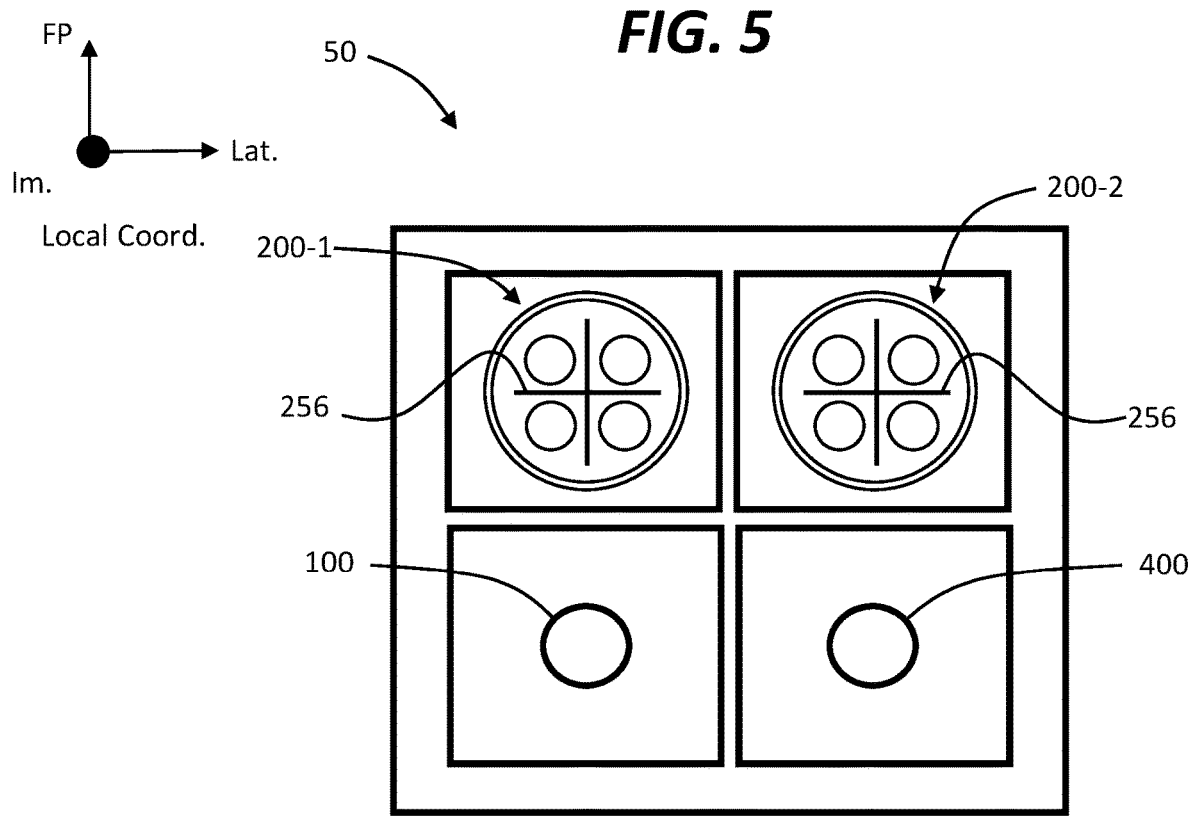
FIG. 6 is a front-end view of an example camera rig illustrating the lenses of the various imaging systems disposed in the camera rig.

FIG. 6 shows a portion of image capture side 52 of an example implementation of camera rig 50. In the illustrated example, camera rig 50 disclosed herein can have a number of different example configurations with respect to the number and types of cameras, the types of image sensors and the overall system layout. Some of these example configurations are discussed below. A person having ordinary skill in the art, after reading this entire disclosure, will recognize that various combinations of the different features of the example configurations disclosed herein can be employed to generate additional example camera rig configurations and that such combinations constitute additional example embodiments of the disclosure. Camera rigs of the present disclosure may also have a modular configuration where the particular cameras and particular components thereof can be interchanged according to a given application.

The camera rig 50 is shown by way of example as including the PAN camera 100, two MS cameras 200-1 and 200-2 and an optional additional camera 400, which can be, for example, a thermal infrared (TIR) camera. The MS cameras 200-1 and 200-2 are each configured to image one or more different spectral portions of the light 820 from the landscape 800 (FIG. 1). In the example shown in FIG. 6, each of the MS cameras 200-1 and 200-2 are "four band," meaning they capture light from four different spectral portions of the light 820, for a total of eight different spectral bands. In the illustrated example this is accomplished with four lenses 250 and corresponding filters 252 (FIG. 7).

The PAN camera 100 is configured to image light over a very large portion of the spectral band of the light 820, e.g., from the ultraviolet (UV) to the near infrared (NIR). In an example, the detected spectral bandwidth is determined by the spectral response of the PAN focal place array (FPA) 112 (FIG. 7), which in an example can be a CMOS detector without integrated wavelength filtering (e.g., a monochrome or panchromatic detector without a Bayer filter or similar filter). In another example, the PAN camera 100 can employ an optional broadband optical filter to define a slightly narrower and thus still a relatively large optical bandpass of the PAN camera 100. Such an optional broadband optical filter can be used to "trim" portions of the UV and IR portions of the captured light where the image sensor response is relatively low. The large optical bandpass of the PAN camera 100 has the advantage of capturing a relatively large amount of light so that exposure times can be kept relatively low. In other examples, camera rigs made in accordance with the present disclosure may not include a PAN camera and may instead only include MS cameras, where one or more of the MS cameras may have a lens with a wider FOV than one or more other MS cameras of the camera rig as described more below.

The PAN camera 100 and the one or more MS cameras 200 and the optional additional camera 400 are supported in proximity to each other by the camera rig 50 and are disposed to be downward looking (e.g., to collect light from the landscape 800) when the aerial imaging system 26 is airborne.

Figure 7:
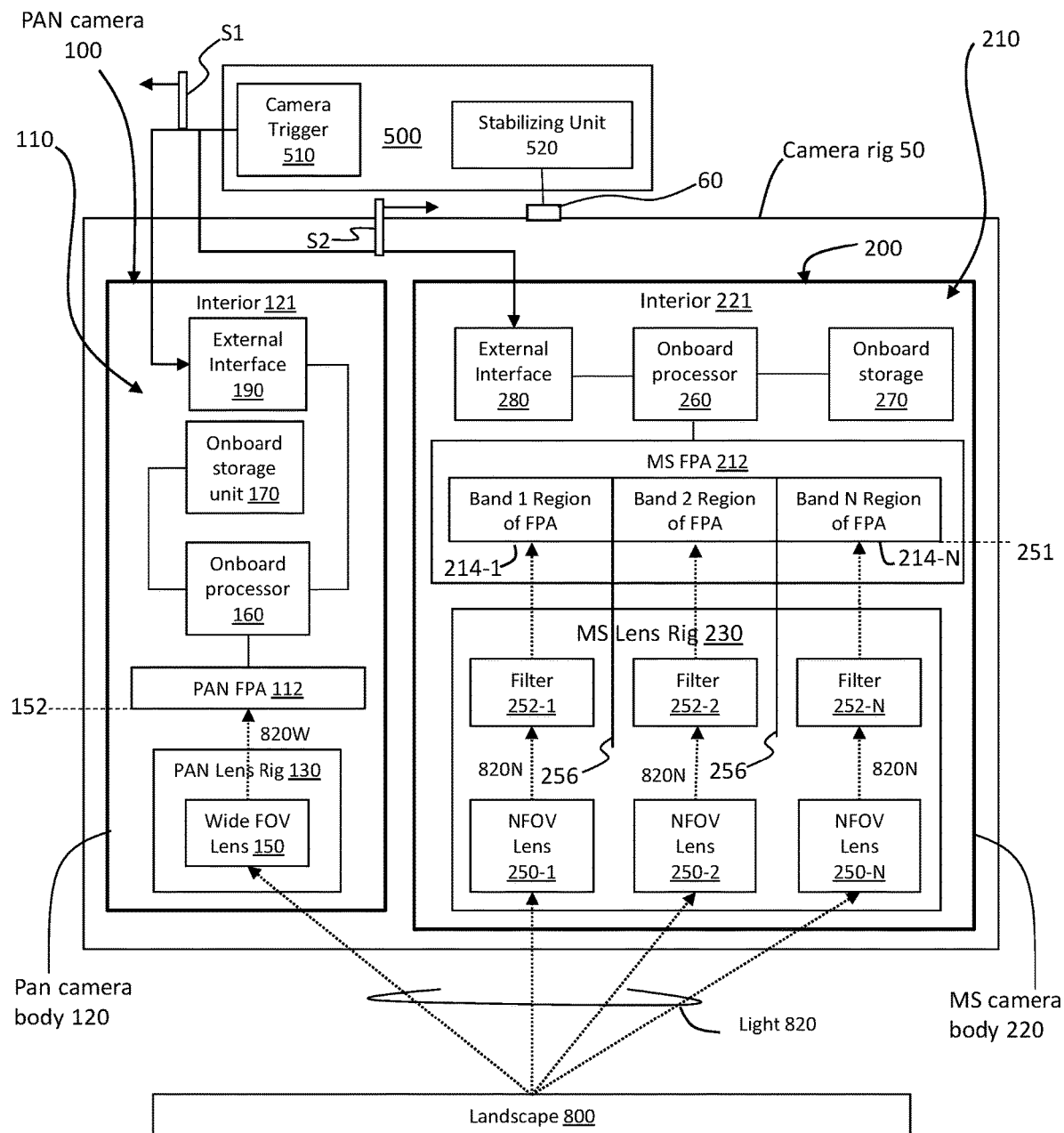
FIG. 7 is a functional block diagram of an embodiment of an aerial imaging system, wherein the system utilizes multiple focal plan arrays (FPAs)

FIG. 7 is a detailed schematic diagram of a first example implementation of the camera rig 50, shown along with the camera rig electronics 500 (see also FIG. 5). In the illustrated example, PAN camera 100 has a camera body 120 having an interior 121 that operably supports PAN camera electronics 110. The PAN camera body 120 also has a PAN lens rig 130 (which may include a mount) that operably supports a lens 150. In the illustrated example, the PAN camera lens 150 has a (relatively) wide angular field-of-view (WFOV) as compared to the lenses 250 of the MS cameras 200. In an example, the angular field of view (AFOV) of the WFOV lens 150 ranges from approximately 40 degrees to approximately 90 degrees, and in some examples, from approximately 50 degrees to approximately 80 degrees. In some examples the AFOV of the WFOV lens 150 has a flight path direction AFOV (FP-AFOV) that is designed to be approximately oriented or aligned with the flight path direction FP of the aerial imaging system 26 and a lateral AFOV (L-AFOV) that is designed to be approximately oriented or aligned with the lateral direction of the aerial imaging system 26 that is approximately orthogonal to the flight path direction. In some examples, the L-AFOV of the WFOV lens 150 is greater than the FP-AFOV of the lens. In some examples, L-AFOV may be in the range of approximately 50 degrees to approximately 90 degrees and in some examples, approximately 60 degrees to approximately 80 degrees, and in some examples, approximately 70 degrees to approximately 80 degrees. In some examples, the FP-AFOV may be in the range of approximately 30 degrees to approximately 80 degrees and in some examples, approximately 40 degrees to approximately 70 degrees, and in some examples, approximately 50 degrees to approximately 70 degrees.

The PAN camera electronics 110 includes a first or PAN FPA 112 located at a focal plane 152 of the WFOV lens 150. The PAN FPA 112 is electrically connected to a PAN onboard processor 160, which in turn is electrically connected to a PAN onboard storage unit 170 and a PAN external interface 190 that is electrically connected to the camera trigger 510 of the camera rig electronics 500. In the illustrated example, the PAN FPA 112 is a panchromatic FPA that detects light over a relatively wide spectral range as discussed above.

For simplicity of illustration, FIG. 7 does not illustrate the components of the TIR camera 400, which may have any configuration known in the art, and in one example may have similar components as MS cameras 200, including a lens, filter, and FPA.

FIG. 7 also illustrates certain functional components of one of the MS cameras 200. For simplicity of illustration FIG. 7 only illustrates the components of one of the MS cameras, however, as described above, camera rig 50 may have additional MS cameras, such as one additional MS camera 200-2 illustrated in FIG. 4 or more. In other examples, the camera rig may have only one MS camera. The illustrated MS camera 200 has an MS camera body 220 having an interior 221 that operably supports MS camera electronics 210. The MS camera body 220 also has an MS lens rig 230 (which may include a mount) that operably supports one or more lenses 250-1, 250-2 and 250-N (only three illustrated for simplicity, however, in the example of FIG. 6, each MS camera has four lenses 250 for capturing four spectral bands). In the illustrated example, an AFOV of one or more of NFOV lenses 250 is narrower than WFOV lens 150. As described more below, providing a composite FOV arrangement, where PAN camera 110 has a larger FOV than MS cameras 200 provides a number of advantages. For example, the ability to obtain high resolution geometrically-referenced spectral image data of a region in a relatively brief period of time by utilizing the WFOV PAN camera 100 to obtain geometric reference information and then augmenting the spectral image data with the geometric reference information using one or more of the methods disclosed herein.

In an example, the AFOV of one or more of the NFOV lenses 250 may be in the range of approximately 20 degrees to approximately 50 degrees, and in some examples, approximately 30 degrees to approximately 40 degrees. In one example, the NFOV lenses 250 may have a focal length (FL) of 35 mm and the FPA 212 (or the region of the FPA imaged by the corresponding MS lens 250 has a lateral dimension of 18 mm, giving an L-AFOV of approximately 29 degrees. In one example, the PAN WFOV lens 150 may have a 16 mm FL lens and the same lateral FPA dimension of 18 mm resulting in L-AFOV of approximately 59 degrees.

The different AFOVs of PAN WFOV lens 150 and MS NFOV lenses 250 may result in different spatial resolutions of the images captured by the PAN and MS cameras. For example, at typical altitude for remote sensing of a vegetative landscape, for example an altitude of approximately 120 m, the ground sample distance (GSD) (the distance between two adjacent pixel centers measured on the ground) of images captured by the PAN camera 100 may be in the range of approximately 20 mm per pixel to approximately 40 mm per pixel, and in some examples, approximately 27 mm per pixel, and in some examples, approximately 36 mm per pixel and in some examples greater than 30 mm per pixel and in some examples greater than 50 mm per pixel. The GSD of the MS cameras 200 may be in the range of approximately 5 mm per pixel to approximately 25 mm per pixel, and in some examples, approximately 12 mm per pixel, and in some examples, less than 50 mm per pixel, and in some examples, less than 40 mm per pixel, and in some examples, less than 30 mm per pixel, and in some examples, approximately 18 mm per pixel, and in some examples in the range of approximately 40% to approximately 60% of the GSD of the PAN camera 100. By way of non-limiting example, an FPA with a lateral dimension of 18 mm and 5000 pixels along that same dimension gives a pixel pitch of 3.6 um. At 120 m altitude, a 16 mm FL WFOV lens 150 would provide a spatial resolution of 27 mm per pixel while a 35 mm FL NFOV lens 250 would provide a spatial resolution of 12 mm per pixel, or approximately 50% of the WFOV GSD. In other examples, the GSD of images captured by PAN camera 100 may be designed and configured to be approximately the same as the GSD of the images captured by MS cameras 200 to facilitate the co-registration correction processes described herein for co-registering the PAN and MS images, where co-registration may be more difficult with greatly varying GSDs.

In some examples the AFOV of the lens of PAN camera 110 may be the same as the AFOV of one or more of the MS cameras 210 and one or more of the MS cameras may have a larger AFOV and corresponding wider FOV. In some examples, camera rig 50 may have a modular configuration where one or more components of the PAN camera and MS cameras may be selectively interchanged. For example, the lens 150 of the PAN camera and/or the lens 250 of one or more of the MS cameras may be selectively interchanged to achieve a desired FOV overlap and spatial resolution for a given application. In some examples, an entire PAN camera 110 and/or an entire MS camera 210 may be removably coupled to the camera rig for selecting desired spectral bands B, AFOVs, spatial resolutions, flight duration, and/or size of geographic region to be imaged during a given flight path for a given application. In some examples, a method of planning a flight path may include selecting a first camera with a first AFOV and selecting a second camera with a second AFOV, where the second AFOV is larger than the first AFOV.

In the illustrated example, the MS camera electronics 210 include a second or MS FPA 212 that is separate and apart from the PAN FPA 112 and that is operably disposed at a focal plane 251 of the NFOV lens(es) 250-1, 250-2 . . . 250-N. The NFOV lenses 250-1, 250-2 . . . 250-N respectively define detection regions 214-1, 214-2 . . . 214-N of the MS FPA 212. Each MS camera 200 has a separate FPA 212 and within a given MS camera 200, the plurality of spectral bands are imaged on a single FPA 212. In other examples, each spectral band may be imaged on a separate FPA. Thus, the NFOV lenses 250-1, 250-2 . . . 250-N form their respective images at their respective spectral bands at the respective detection regions 214-1, 214-2 . . . 214-N (only some labeled) on the FPA 212, which may also be referred to herein as spectral imaging regions.

The MS FPA 212 is electrically connected to an MS onboard processor 260, which in turn is electrically connected to an MS onboard storage unit 270 and an MS external interface 280 that in turn is electrically connected to the camera trigger 510 of the camera rig electronics 500. As noted above, the entire camera rig 50 is operably connected to the aerial vehicle 30 in a stabilized manner by the stabilizer 60, which may include the stabilizing unit 520, to provide stabilized imaging by the PAN camera 100 and the one or more MS cameras 200 as the aerial imaging system 26 moves over the flight path 14 (see FIG. 1).

In the illustrated example, MS FPA 212 is a panchromatic FPA used in combination with select narrow bandpass optical filters 252 for each of the detection regions 214-1, 214-2 and 214-N. In the illustrated example, the MS FPA 212 does not include a separate Bayer filter or similar color filter array. The narrow bandpass filters 252 are disposed optically downstream of corresponding narrow FOV (NFOV) lenses 250-1, 250-2 and 250-N and in the respective optical paths of the light 820 collected by the NFOV lenses. The filters 252-1, 252-2, and 252-N are used to define from the collected broadband spectral light 820 different spectral bands B (e.g., $B_1$, $B_2$ and $B_N$) centered around respective different center wavelengths $\lambda$ (e.g., $\lambda_1$, $\lambda_2$, . . . $\lambda_N$) and having respective bandwidths $\Delta\lambda$ (e.g., $\Delta\lambda_1$ $\Delta\lambda_2$, . . . $\Delta\lambda_N$) about the respective center wavelengths. Any combination of one or more spectral bands B now known or later developed in the art of spectral imaging, including multispectral remote sensing of landscapes may be used. In an example, the bandwidths $\Delta\lambda$ are relatively narrow, e.g., several nanometers to tens of nanometers. In some examples, the spacing of adjacent center wavelengths $\lambda$ is greater than one half of the corresponding adjacent bandwidths $\Delta\lambda$, i.e., there is no overlap of adjacent spectral bands B, while in other examples, there is overlap between two or more of the spectral bands. In some examples, the spectral bands B are designed, configured and selected to obtain information for a particular species or group of species of plants, where the spectral bands are selected according to the particular combinations of pigments and corresponding wavelengths of light absorption and reflection of the species of interest. By way of example, the spectral bands B for a given instantiation of camera rig 50 may include one or more of violet light (VL) with, e.g., a wavelength band of approximately 410 nm to approximately 450 nm, blue light (BL) with, e.g., a wavelength band of approximately 460 nm to approximately 500 nm, green light (GL) with, e.g., a wavelength band of approximately 530 nm to approximately 570 nm, orange light (OL), with, e.g., a wavelength band of approximately 590 nm to approximately 630 nm, red light (RL) with, e.g., a wavelength band of approximately 640 nm to approximately 680 nm, red-edge radiation (RE), with, e.g., a first wavelength band of approximately 690 nm to approximately 730 nm and a second wavelength band of approximately 720 nm to approximately 760 nm, and/or near-infrared radiation (NIR) with, e.g., a wavelength band of approximately 820 nm to approximately 870 nm. In some examples the plurality of NFOV lenses 250 and corresponding filters 252 are designed and configured to capture one or more of violet light (VL) at a center free-space wavelength, $\lambda$, of approximately 430 nm; blue light (BL) at a center free-space wavelength, $\lambda$, of approximately 480 nm; green light (GL) at a center free-space wavelength, $\lambda$, of approximately 550 nm; orange light (OL) at a center free-space wavelength, $\lambda$, of approximately 610 nm; red light (RL) at a center free-space wavelength, $\lambda$, of approximately 660 nm; red-edge radiation (RE) at a center free-space wavelength, $\lambda$, of approximately 710 nm; red-edge radiation (RE) at a center free-space wavelength, $\lambda$, of approximately 740 nm; and near-infrared radiation (NIR) at a center free-space wavelength, $\lambda$, of approximately 850 nm. Thus, in one example, at each triggering event, MS cameras 200 may be configured to capture eight separate MS images each having a separate and distinct spectral band B. In other examples, one or more MS cameras 200 may be designed to capture any combination of the foregoing spectral bands.

For the purpose of vegetation mapping of both biomass (e.g., leaf area index: LAI) and leaf chlorophyll concentrations (LCC)), it can be useful to collect image data for blue-light (BL), orange light (OL), red-edge radiation (RE), and near-infrared radiation (NIR). In examples where MS images include only BL, GL, RL, and NIR; GL and RL may be averaged to make an OL image. In some examples, a narrow-band OL image is utilized instead of or in addition to than a wide-band OL image made from GL and RL. Images captured by thermal infrared radiation (TIR) camera 400 can be utilized to have data about the temperature of the imaged materials. In some examples, a GSD of TIR images captured by system 26 may be larger than a GSD of the MS and PAN images captured by the system, for example, approximately 5%-15% larger. In some examples, an AFOV of the TIR camera 400 may be approximately the same as the AFOV of the MS cameras 200 and narrower than the AFOV of the PAN camera 100.

NFOV lenses 250-1, 250-2 and 250-N and their corresponding narrow bandpass filters 252-1, 252-2, . . . 252-N form corresponding spectral images on respective detection regions 214-1, 214-2 and 214-N of the panchromatic MS FPA 212. In an example, baffles 256 are operably disposed in the interior 221 of the MS camera body 220 between the optical paths of the NFOV lenses 250-1, 250-2, . . . 250-N and extending to the panchromatic MS FPA 212 to prevent stray light from one spectral band B from reaching the detection region 214 of a different spectral band (see FIGS. 4 and 7).

In another example, MS FPA 212 may be configured as a polychromatic FPA that is configured to detect different wavelengths of light in sub-regions of the FPA using a set of light-detecting elements having different wavelength sensitivities such as known in the art. An example polychromatic FPA employs a Bayer pattern configuration, such as disclosed in U.S. Pat. No. 3,971,065 to Bayer and entitled "Color Imaging Array," and which is incorporated by reference herein. Bayer pattern image sensors and similarly configured image sensors are known in the art and are used extensively in digital cameras. Bayer pattern image sensors have also found use in multispectral cameras used for agricultural applications, such as the one described in U.S. Pat. No. 10,574,911, entitled "Multispectral imaging apparatus," and which is incorporated by reference herein. A typical polychromatic FPA is formed by using a panchromatic FPA with a color filter array formed integral therewith, e.g., disposed directly on the pixel array of an FPA surface using either a Bayer pattern or like pattern of alternating ranges of wavelengths, e.g., red, green and blue (R, G, B) filters. (By contrast, in the example illustrated in FIG. 7, MS FPA 212 does not have a filter array integrally formed on the FPA and instead utilizes filters 252 for capturing spectral images).

In such an alternate example where a Bayer pattern or other integral color filter array is used, the MS camera may be designed to minimize or eliminate any out-of-band contamination of detected light for the wavelength selective detection elements as defined by the color filter array. Contamination occurs because the color e.g., R, G, and B, filters used to define the wavelength selective detection elements of the Bayer pattern do not have sharp cutoffs. This means that light of one color will pass through and be detected by a detection element of another color. While this out-of-band contamination does not present substantial issues in most applications such as digital camera color photography, it can be problematic for spectral imaging because it results in less accurate intensity readings for the given spectral band. To minimize such contamination, filters 252 may be used in combination with the Bayer filter.

Bayer pattern and like image sensors also require an interpolation of the different wavelength-selective detection elements (e.g., color pixels) to arrive at a single intensity value. This results in a loss of resolution in the final image, since multiple pixels' intensities are combined to define a single pixel intensity for a larger combined pixel. For example, a 16-megapixel (MP) image sensor that uses a Bayer pattern that combines 4 pixels (e.g., RGGB) to define a combined (larger) pixel has an effective resolution of only 4 MP. Thus, FPA 212 illustrated in FIG. 7 provides a higher resolution image as compared to a Bayer pattern filter FPA. FPAs with a Bayer pattern filter or similar may, however, be used in implementations of the present disclosure.

Figure 8:
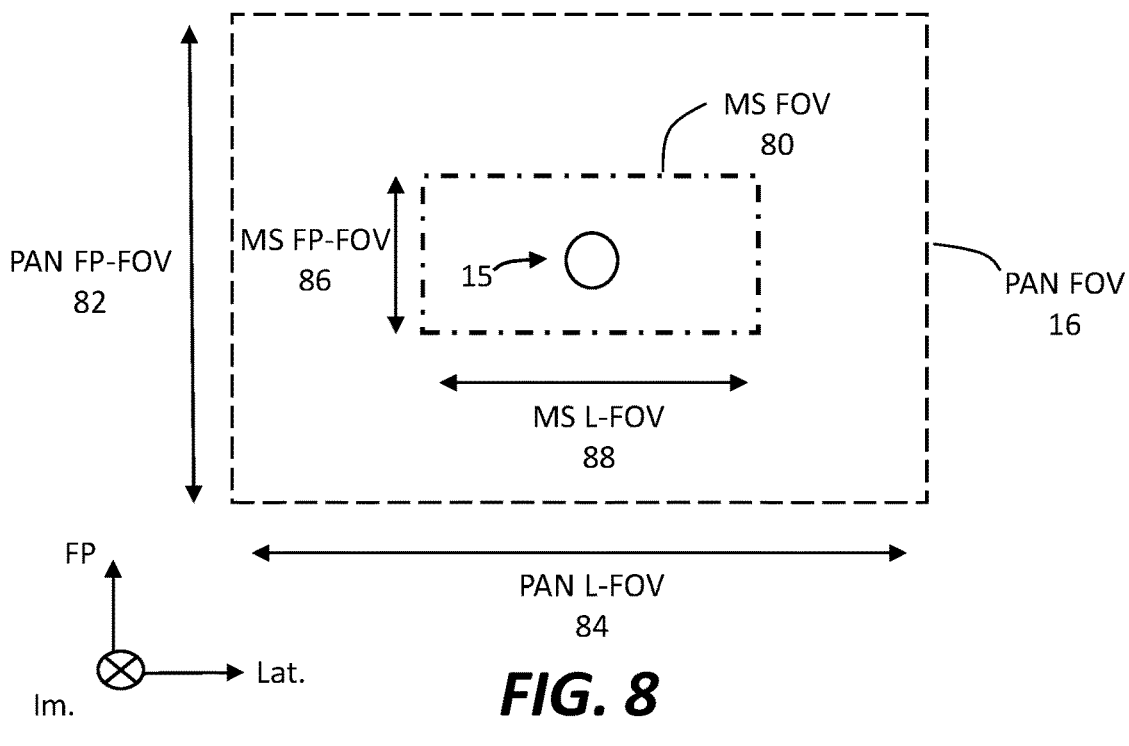
FIG. 8 is a schematic diagram conceptually illustrating the relative sizes of a fields of view (FOV) of a wide field of view (WFOV) panchromatic (PAN) camera and a narrower field of view (NFOV) multispectral (MS) camera disposed on the camera rig when the camera rig is at a certain elevation or altitude above a surface being imaged.

FIG. 8 conceptually illustrates the relative sizes of a FOV 16 (shown in dash-dash lines) of PAN camera 100 relative to a FOV 80 (shown in dash-dot lines) of MS camera(s) 200 at a given altitude above a landscape. As noted above, in some examples, the MS FOV 80 may be smaller than the PAN FOV 16. As indicated by the local coordinates, FIG. 8 is a top down view of a scene being imaged by aerial imaging system 26 when in flight and illustrates one example where the lateral dimension of the FOV (L-FOV) for both the PAN camera 100 and MS camera(s) 200 is greater than the flight path direction FP-FOV. Further, the FOV 16 of the PAN camera 100 in the FP and L directions (PAN FP-FOV 82, PAN L-FOV 84) is substantially larger than the MS camera FP-FOV 86 and L-FOV 88. For example, at an example altitude for remote sensing of a vegetative landscape of approximately 120 m, the cross-sectional area of the PAN FOV 16 may be in the range of 50% to 500% greater than the cross-sectional area of the MS FOV 80, and in some examples, in the range of 100% to 400% greater, and in some examples, 100% to 300% greater, and in some examples, at least 100% greater than the cross-sectional area of the MS FOV.

Figure 9:
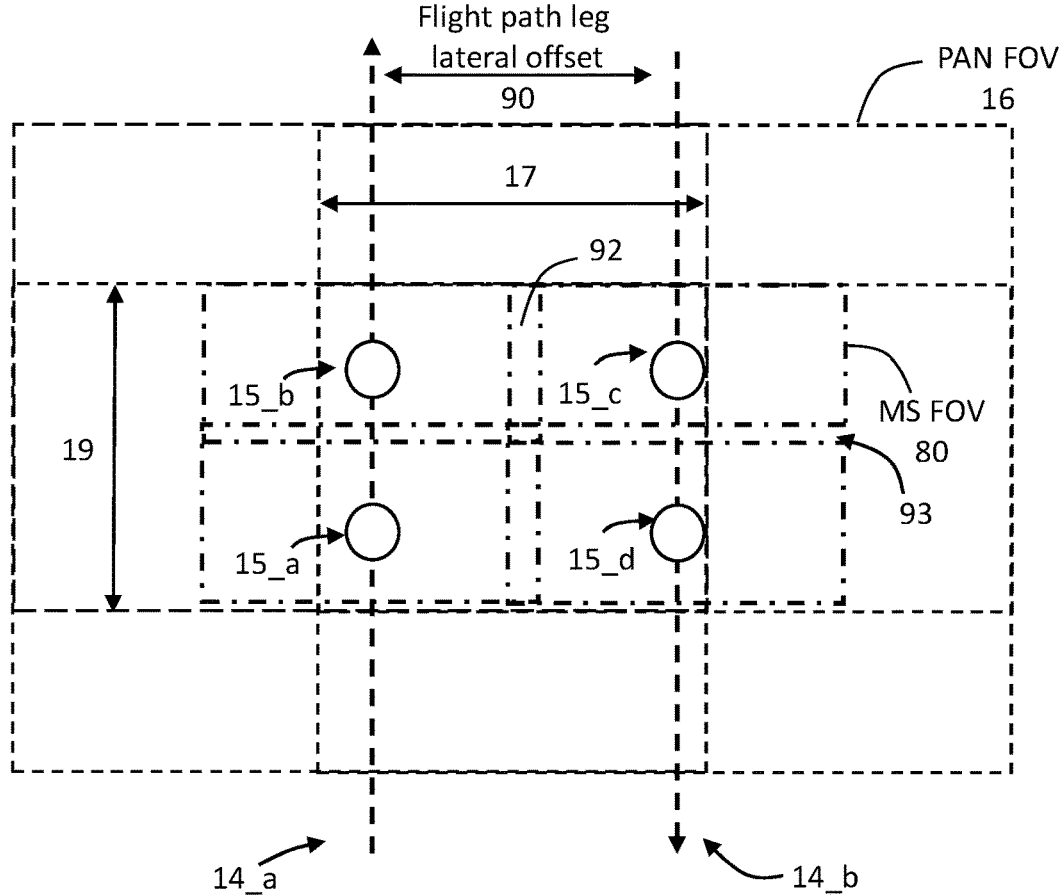
FIG. 9 is a schematic diagram of the WFOV and NFOV of FIG. 8 at four image capture locations along an example flight path, illustrating an example overlap of the WFOV and NFOV at adjacent image capture locations.

FIG. 9 illustrates a subset of four of the image capture locations 15 of the example flight path 14 (see also FIG. 3), specifically, locations 15_a and 15_b in a first leg 14_a of the flight path in a first flight path direction and another two locations 15_c and 15_d in a subsequent leg 14_b of the flight path that is adjacent to the first leg in a second flight path direction that is opposite the first flight path direction. FIG. 9 illustrates how flight path 14 may be designed and configured to utilize a particular combination of AFOVs of the PAN and MS cameras disclosed herein to obtain high resolution geometrically-referenced spectral data of a given geographical area in a relatively short amount of time. Specifically, a lateral offset 90 of the flight path legs 14_a, 14_b may be designed and configured to achieve a lateral overlap 17 of the PAN FOVs 16 resulting in a corresponding lateral overlap of frames of PAN images acquired at the image capture locations 15. The resulting lateral overlap 92 of the MS FOVs 80 is substantially less than the PAN FOV lateral overlap 17. In some examples, the PAN FOV lateral overlap 17 may be in the range of approximately 30% to approximately 90%, and in some examples, in the range of approximately 50% to approximately 90%, and in some examples, in the range of approximately 60% to approximately 90% and in some examples, in the range of approximately 75% to approximately 80%, and in some examples, greater than 60%, and in some examples, greater than 70%. By contrast, in some examples the corresponding lateral overlap 92 of the MS FOVs 80 in adjacent legs 14_a and 14_b of flight path 14 may be substantially less than overlap 17 and may be in the range of approximately −20% to approximately 50%, and in some examples, may be in the range of approximately 0% to approximately 40%, and in some examples, approximately 10% to approximately 30%, and in some examples, less than 50%, and in some examples, less than 40%, where a negative overlap (e.g., −20% overlap) means there is a spacing between adjacent FOVs where a particular region is not captured in an image.

A desired longitudinal overlap 19 in the flight path direction FP may be obtained by varying the frame rate, or the rate at which the cameras 100, 200 are triggered to capture an image and/or varying the speed of the aerial vehicle. In the illustrated example, the triggering frequency is selected to obtain a desired longitudinal overlap 19 in the PAN FOVs 16 resulting in corresponding overlaps in sequential PAN images, where the overlap may be in the range of approximately 30% to approximately 70%, and in some examples, approximately 30% to approximately 50%, and in some examples greater than 50%, and in some examples, greater than 60%, and in some examples, greater than 70%.

In the illustrated example, for simplicity of illustration, the PAN and MS cameras are triggered at substantially the same time and have substantially the same frame rate. The resulting longitudinal overlap 93 in the MS FOVs 80 is, therefore, substantially less than the longitudinal overlap 19 of the PAN FOVs 16 due to the lower AFOV of the MS NFOV lenses 250, and may be in the range of approximately −20% to approximately 40%, and in some examples, may be in the range of approximately 0% to approximately 30%, and in some examples, approximately 10% to approximately 30%, and in some examples, less than 50%, and in some examples, less than 40%, and in some examples, less than 30%.

In other examples, the frame rates of the PAN camera 100 and one or more of the MS cameras 200 may not be the same. For example, the MS cameras 200 may be triggered more frequently (operated with a higher frame rate) resulting in more MS images being captured.

Referring again to FIG. 7, the WFOV light 820W is imaged by the WFOV lens 150 of the PAN camera 100 onto the PAN FPA 112. A digital image of the portion of the landscape 800 within the WFOV of the WFOV lens 150 of the PAN camera 100 is captured based on a first or PAN camera trigger signal S1 from the camera trigger 510. These digital images are referred to below as PAN WFOV images, and sometimes referred to as PAN images. A series of PAN camera trigger signals S1 sent from the camera trigger 510 to the PAN onboard processor 160 through the external interface 190 controls the activation of the first panchromatic FPA 112 and acts as an electronic shutter. This enables capturing a series of PAN WFOV digital images of the landscape 800 at image capture locations 15 as the aerial imaging system 26 moves over the flight path 14. As described above in connection with FIG. 9, in an example, the first camera trigger signals S1 are generated by the camera trigger 510 such that there is substantial longitudinal overlap 19 of the adjacent captured PAN WFOV digital images. Lateral overlap 17 of the PAN WFOV digital images is created by the lateral offset 90 of adjacent legs of the flight path 14 (FIG. 9). The series of PAN WFOV digital images can be stored in, e.g., the PAN onboard storage unit 170 of the PAN camera electronics 110 and/or another storage unit in communication with PAN camera 100.

NFOV light portions 820N are imaged onto corresponding respective detection regions 214-1, 214-2 and 214-N of panchromatic MS FPA 212 by corresponding MS NFOV lenses 250-1, 250-2 ... 250-N. Respective digital images of the portions of the landscape 800 within the NFOVs of the NFOV lenses 250-1, 250-2, ... 250-N of the MS cameras 200-1, 200-2, ... 200-N are captured based on a second or MS camera trigger signal S2 from, e.g., the camera trigger 510. These images are referred to as MS NFOV digital images and sometimes referred to as MS images. A series of MS camera trigger signals S2 sent from the camera trigger 510 to the MS onboard processor 260 through the external interface 280 controls the activation of the MS FPA 212 and acts as an electronic shutter. This enables capturing a series of MS NFOV digital images of the landscape 800 for the different spectral bands B as the aerial imaging system 26 moves over the flight path 14. The MS NFOV digital images can have a longitudinal overlap 93 and lateral overlap 92 created by the lateral offset of adjacent legs of the flight path 14.

In one example, a single second trigger signal S2 can be used for each of the MS cameras 200 given their relative proximity as compared to the typical altitude AL of the aerial imaging system 26. In some examples, the camera trigger 510 is configured to provide the first trigger signals S1 and second trigger signals S2 offset in time or asynchronous so that the MS NFOV digital images of a given portion of the landscape taken by the MS cameras 200 reside within (for example, centered within) a PAN WFOV digital image of the corresponding portion of the landscape taken by the PAN camera 100. In one example, the camera trigger 510 is configured to determine a timing delay between the first and second timing signals S1 and S2 based on a spatial offset of the WFOV and the NFOV of the PAN and MS cameras as a function of the current speed and altitude of the aerial imaging system over the flight path 14, the distance between the PAN camera 100 MS cameras 200 on the camera rig 50, and/or other camera parameters, such as shutter speed and exposure time. In other examples, two or more of the cameras 100, 200, 400 on the camera rig 50, and in some examples, all of the cameras on the camera rig are triggered at the same time. In some examples, where the external orientation (EO) of a first camera's images, e.g., PAN camera 100, are used for photogrammetry processing of a second camera's images, e.g., MS camera 200, it can be useful for both cameras to be trigged at the same time, e.g., with the same trigger signal so that the same portion of the landscape is imaged at the same time by the focal planes of the first and second cameras.

The above process results in a series of PAN WFOV digital images captured by the PAN FPA 112 and a series of MS NFOV digital images at the select bandwidths captured by the different detection regions 214-1, 214-2 and 214-N of the panchromatic MS FPA 212. The series of PAN WFOV digital images can be stored in the PAN onboard storage unit 270 of the PAN camera electronics 110 and/or another storage unit in communication with the PAN camera electronics.

Figure 10:
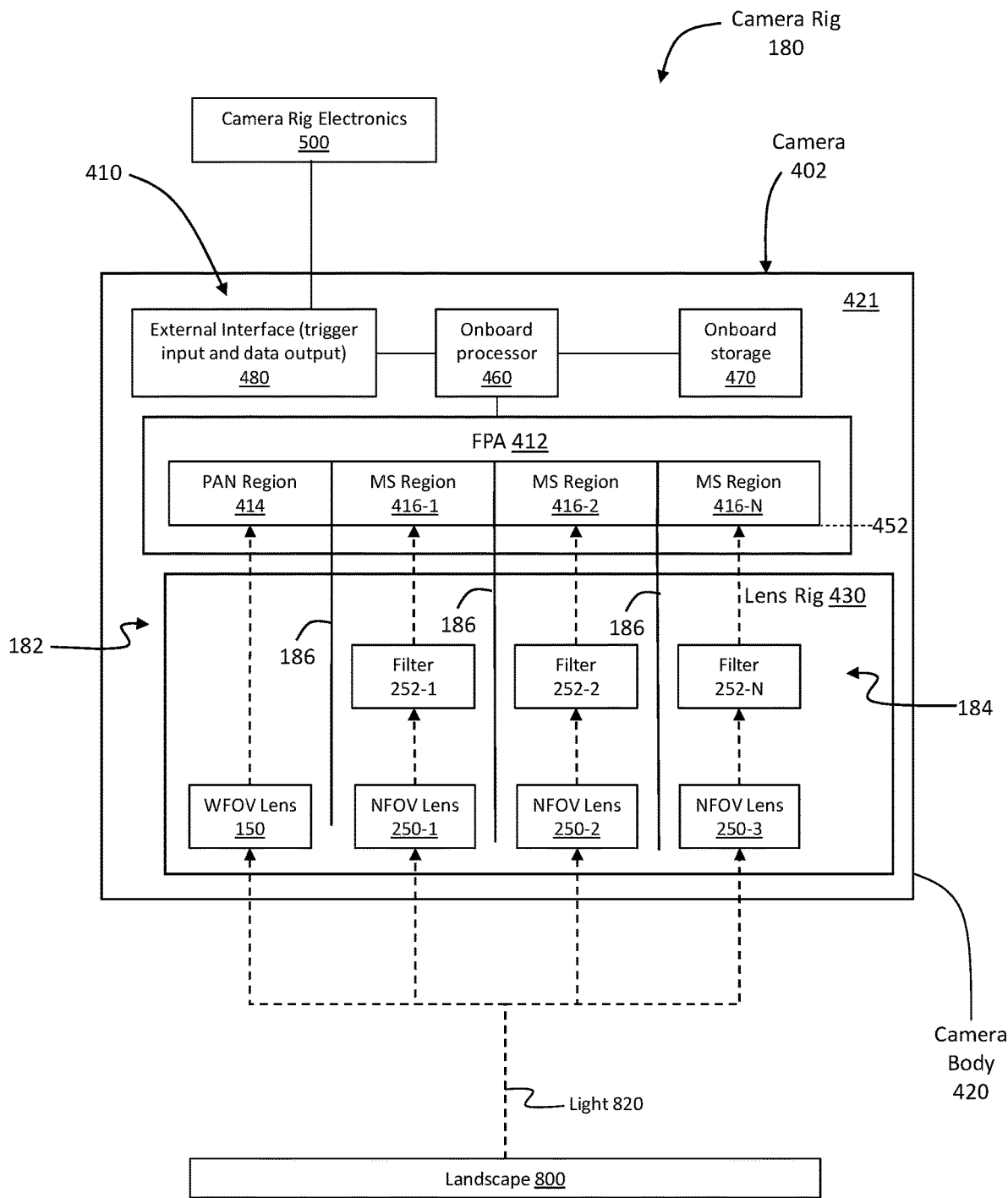
FIG. 10 is a schematic diagram of another embodiment of a camera rig employing a single FPA for both PAN and MS cameras.

FIG. 10 is a schematic diagram a second example implementation of a camera rig 180 that could be used instead of or in addition to camera rig 50. Camera rig 180 is similar to camera rig 50 except that a PAN camera 182 and MS cameras 184 share a common FPA 412. In the illustrated example, camera rig 180 supports a combined camera 402 having a camera body 420 having an interior 421 and a single lens rig (mount) 430. The single lens rig 430 supports the WFOV lens 150 associated with PAN imaging and the NFOV lenses 250-1, 250-2, ... 250-N associated with MS imaging, along with the aforementioned filters 252-1, 252-2, ... 252-N.

In addition, camera rig 180 utilizes a single FPA 412 having a PAN detection region ("PAN region") 414 for the WFOV lens 150 for PAN imaging and MS detection regions ("MS regions") 416-1, 416-2 and 416-N for the NFOV lenses 250-1, 250-2, ... 250-N for MS imaging. The single FPA 412 resides at a common focal plane 452 of the WFOV lens 150 and the NFOV lenses 250-1, 250-2, ... 250-N.

Camera rig 180 includes camera electronics 410 comprising an onboard processor 460, an onboard storage (memory) 470 and an external interface 480 electrically connected to the camera trigger 510 of the camera rig electronics 500 (see FIGS. 5 and 7). Thus, the PAN camera 182 and the MS cameras 184 share a single common FPA 412 and a single camera electronics 410 of the combined camera 402 rather than having their own respective PAN and MS camera electronics 110 and 210 as in the first example camera rig 50 shown in FIG. 7.

In an example, baffles 186 are operably disposed in the interior 421 of the camera body 420 between the optical paths of the WFOV lens 150 and the NFOV lenses 250-1, 250-2, ... 250-N and extending to the FPA 412 to prevent stray light from one spectral band B from reaching the detection region 214 of a different spectral band.

In one embodiment FPA 412 is panchromatic. In another embodiment, the FPA 412 is polychromatic and employs, for example, a Bayer pattern or like integrated filter pattern of, e.g., alternating red, green and blue (R, G, B) filters. In one implementation of a polychromatic FPA 412, the filters 252-1, 252-2, ... 252-N may still be kept in place as narrow bandpass filters centered on corresponding wavelengths to thereby reduce or eliminate potential out-of-band contamination that may otherwise occur with a Bayer pattern or like integrated pattern polychromatic image sensor.

Figure 11:
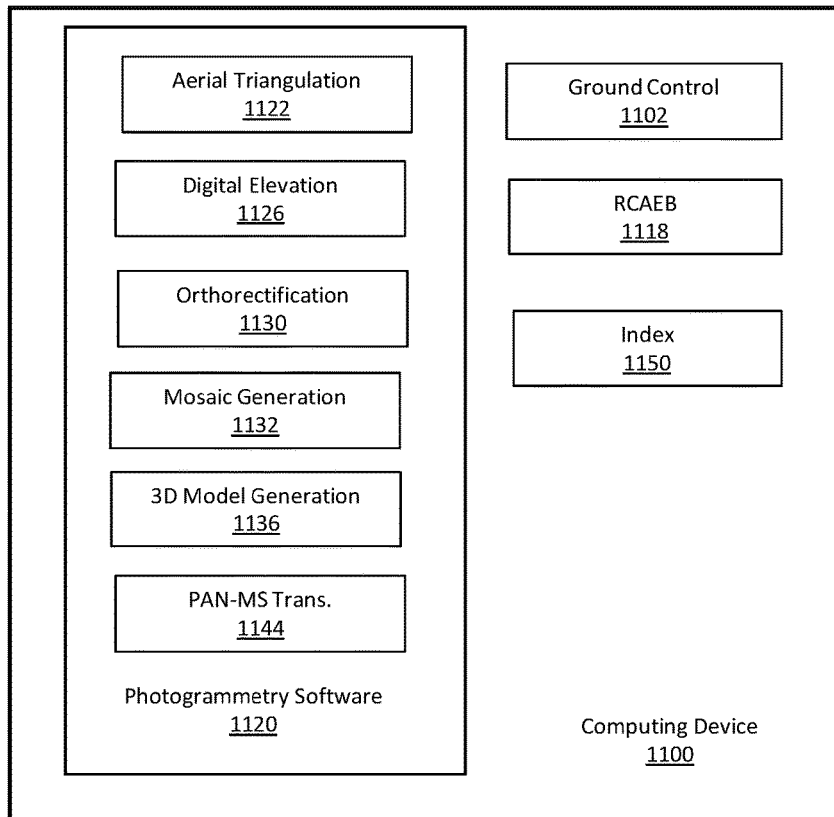
FIG. 11 is a functional block diagram of a computing device and storage device of an imaging system of the present disclosure.
Figure 11:
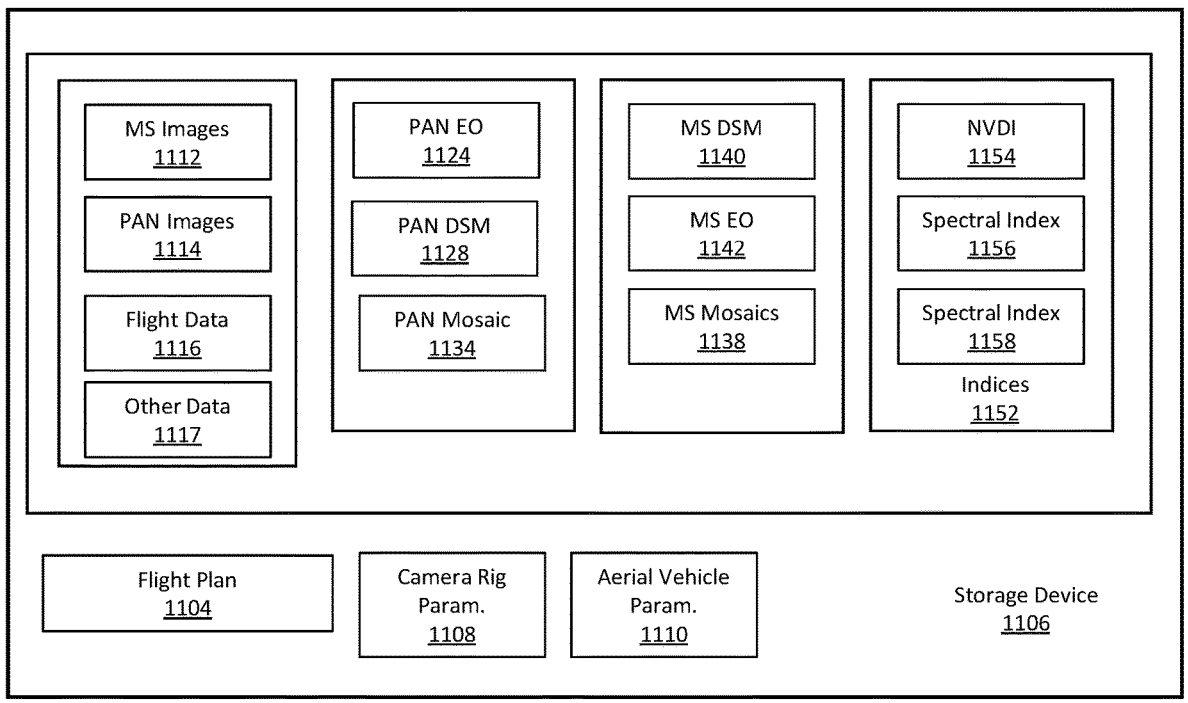

FIG. 11 is a functional block diagram of an architecture of one example of a computing device 1100 that may form part of system 10 (FIG. 1) and be used for controlling the aerial imaging system 26, storing images captured by the aerial imaging system, and processing the captured images. In the illustrated example, computing device 1100 includes a ground control module 1102 that may provide any of the features and functionality of aerial drone ground control software known in the art. In an example, computing device 1100 in combination with ground control module 1102 is the ground control station 900 (FIG. 1). By way of example, ground control module 1102 may be configured to generate a flight plan, including defining a flight path such as flight path 14, using any techniques known in the art, and store flight plan 1104 in a storage device 1106 communicatively coupled to computing device 1100. For example, ground control module 1102 may be configured to receive camera rig parameters 1108 and aerial vehicle parameters 1110 stored in storage device 1106 and/or provided as a user input via a graphical user interface as is known in the art. The ground control module 1102 may also be configured to receive a user-selection of a region of interest, for example, a region of a vegetative landscape, to be imaged and mapped, and automatically generate a flight trajectory for the aerial imaging system 26. The calculated trajectory may be stored as the flight plan 1104 in storage device 1106 and also transmitted over a wired or wireless connection to the aerial imaging system 26 for storage in local memory, e.g., aerial vehicle electronics 300 (FIG. 4).

Aerial vehicle parameters 1110 stored in storage device 1106 and accessible by the various modules of computing device 1100 may include any parameter of the aerial vehicle 30, such as the make and model of the aerial vehicle, battery capacity, flight speed, etc. Camera rig parameters 1108 stored in storage device 1106 and accessible by the various modules of computing device 1100 may include any parameter of the camera rig 50. Non-limiting examples include parameters of a PAN camera, such as PAN camera 100, such as parameters of the WFOV lens 150, including the AFOV, focal length, lens geometry parameters, such as distortion, etc., parameters of the PAN FPA 112, such as the height and width of the PAN FPA, number of pixels, electronic shutter parameters, etc. and any other interior orientation (10) data defining the internal geometry of the PAN camera. Camera rig parameters 1108 may also include analogous parameters, including IO data, for each of MS camera disposed on the rig, such as each of MS cameras 200, and also include spectral band parameters B for each MS camera. Camera rig parameters 1108 may also include relative spatial positioning information for the various cameras on the camera rig, such as the local X, Y, Z location or spatial offset of each camera lens, or other component of each camera, relative to a common local origin point on the camera rig, and the direction of view of each lens.

After executing a flight plan and capturing data, including images of a region of interest, the images can be transmitted from the aerial imaging system 26 to the computing device 1100 for analysis and post-processing. The MS images captured by each MS camera, such as each MS camera 200 can be stored in MS images 1112 and the PAN images captured by a PAN camera, such as PAN camera 100, can be stored in PAN images 1114. Aerial imaging system 26 may also be configured to record flight data for the flight in which images 1112 and 1114 were captured, which can be stored as flight data 1116. Flight data may include, for example, approximate, latitude, longitude, pitch, roll, yaw, altitude, and/or other flight data recorded by, e.g., aerial vehicle electronics 300 (FIG. 5) and/or a separate camera trigger and geotag device operably coupled to the aerial vehicle 30. In examples where aerial imaging system 26 contains additional sensors, such as a TIR camera, LIDAR, or other sensor, the additional sensor data may similarly be transmitted for storage as other data 1117 for analysis.

In an example, MS images 1112 from a single flight may include hundreds or thousands of image frames captured by separate MS cameras. In the example illustrated in FIGS. 6 and 7, camera rig 50 includes two MS cameras 200, each configured to capture four NFOV MS images at different spectral bands, resulting in eight MS image frames being captured at each triggering event of the MS cameras. Camera rig 50 also includes a PAN camera 100 that captures a PAN image at each triggering event of the PAN camera and a TIR camera 400 that captures an infrared image at each triggering event of the TIR camera. Computing device 1100 may include a Rig Camera Alignment & Exposure Balancing (RCAEB) module 1118 for co-registering one or more of the disparate channels of image frames captured by the different cameras disposed on the camera rig. The co-registration process performed by the RCAEB module 1118 may utilize camera rig parameters 1108 and flight data 1116. The RCAEB module 1118 may also be configured to perform an exposure balancing of the images to account for different exposures of the images taken at a given triggering event, for example due to different shutter speed and ISO of each camera. In an example, RCAEB module 1118 may generate new image data products from the originally captured images, for example, Raster-Vector-CAD (.rvc) files that are linked to the components in the original image files (e.g., .tif) and augmented with geotag data from flight data 1116. In one example, RCAEB module 1118 is configured to select a best spatial quality image, e.g., a Green Light (GL) image, or an image captured by PAN camera 100, as the base image. Next, RCAEB module 1118 identifies a plurality, e.g., hundreds, of tie points in the base image and finds corresponding points in each of the non-base images where the spatial properties of each pair of images are the same or very similar. Some of the identified tie points may be discarded as not accurate, the remaining tie points maintained and the RCAEB module may then generate a mathematical model for resampling each non-base image to match the base image, where each resampled image is co-registered with the base image. In some examples, RCAEB module 1118 may be configured to utilize PAN images as the base images and to process each of the MS and TIR images to generate a new set of co-registered images. Selecting the PAN images as the base images can be beneficial when, as described more below, the EO and DSM generated from the overlapping PAN images is utilized for generating orthorectified mosaics of the MS and TIR images. In other examples, as described more fully below, RCAEB module 1118 may be utilized to co-register only some of the image channels and not co-register others. For example, RCAEB module 1118 may be used to co-register each set of spectral images captured by a single MS camera 200, or in other example, co-register all spectral images captured by all MS cameras 200 but may not be used to resample the spectral images to co-register the spectral images with the PAN images.

Computing device 1100 may also include photogrammetry software 1120 that may have any of the features and functions of photogrammetry software known in the art. In the illustrated example, photogrammetry software 1120 includes an aerial triangulation module 1122 for performing an initial linking the various image frames, e.g. image frames in PAN images 1114 and derive accurate external orientation (EO) of the image sensor at each image frame. Aerial triangulation module 1122 may be configured to perform tie point extraction, optionally import ground control points, perform a bundle adjustment and generate a triangulation report and EO data.

In an example, the aerial triangulation module 1122 adjusts tie points and excludes outliers in the bundle adjustment step and performs adjustments for internal image distortions and generates an EO file that has an accurate x, y, z global coordinate location value for the location of the image sensor and the values for three global coordinate rotation angles (omega (pitch), phi (roll), and kappa (yaw) of the image sensor, at each image frame and stores the EO file as, e.g. PAN EO data 1124 when the PAN images 1114 are being processed, which can be stored in, e.g., storage device 1106.

Photogrammetry software 1120 may also include a digital elevation module 1126 that is configured to generate one or more digital elevation data products from the triangulated images. By way of non-limiting example, digital elevation products may include one or more of a digital surface model (DSM), digital elevation model (DEM), digital terrain model (DTM) and/or point cloud model, which may each be stored, e.g., in storage device 1106, such as, e.g., a PAN image DSM 1128. Digital elevation module 1126 may be configured to use the tie points in two or more images and the EO data generated by the aerial triangulation module 1122 and camera properties obtained from, e.g., camera rig parameters 1108 to determine pixel locations in 3D space, forming a "point cloud." Digital elevation module 1126 may then perform surface-fitting on the point cloud to create the DSM, e.g., PAN DSM 1128.

Photogrammetry software 1120 may also include an orthorectification module 1130 configured to perform an orthorectification of the image data to form orthorectified images. Orthorectification of an image involves modifying certain pixels so that all pixels are in an accurate x, y position on the ground resulting in an orthorectified view (looking straight down, also referred to as a nadir view). An orthorectification process can apply corrections for optical distortions from the image system and apparent changes in the position of ground objects caused by the perspective of the sensor view angle and ground terrain. An orthorectification process generally requires image sensor parameters, accurate EO data for each image, e.g. PAN EO data 1124 and an accurate terrain model, e.g. PAN DSM 1128.

In an example, the orthorectification module 1130 uses ray tracing to follow each image pixel through the camera to the DSM and then on a map location, such as a planimetric GIS map raster in order to generate a true orthorectification for each image, for example, a GeoTIFF image. Photogrammetry software 1120 may also include a mosaic generation module 1132 for forming a mosaic of the orthorectified images and store, for example, a PAN mosaic 1134 in memory. In an example, mosaic generation module 1132 is configured to perform a nadir optimization process that includes adding brightness values in each orthorectified image file to a mosaic from a part of an image frame that is closest to a nadir point. Mosaic generation module 1132 may also be configured to perform a feathering process where the brightness values of pixels in the mosaic along cut lines (locations that are equally close to two nearby nadir points) are adjusted so that the mosaic values look continuous across each cut line. In the resulting mosaics, the brightness values for each spectral band (MS and TIR) is composed mostly of at nadir or near-nadir image values, making the resulting mosaicked MS and TIR images most useful for further processing for information extraction algorithms. Photogrammetry software 1120 may also include a 3D model generation module 1136 for generating additional 3D models of the imaged landscape from the images captured by the aerial platform.

In some examples, both the MS images 1112 and the PAN images 1114 may be processed with each of the aerial triangulation module 1122, digital elevation module 1126, orthorectification module 1130 and mosaic generation module 1132 to separately form geo-referenced orthorectified PAN mosaic 1134 and MS mosaics 1138. In other examples, however, some or all of the foregoing photogrammetry modules may only be needed to process the PAN image data 1114 and the resulting geometric information, such as the PAN EO file 1124, may be used to generate the MS EO data 1142, MS DSM 1140, MS mosaics 1138, or other spectral data products. One benefit of such an approach is that less overlap of the MS images 1112 is required, such as less longitudinal overlap 93 and lateral overlap 92 (FIG. 9) as would be needed to perform a full photogrammetric process on the MS images 1112. Methods of the present disclosure are capable of generating orthorectified MS mosaics 1138 and MS EO files 1142 for each spectral band of MS images 1112, and any of a variety of other geometric referenced data products of the MS images 1112 from MS images 1112 with minimal overlap. By contrast, in prior art approaches where a full photogrammetric processing of the MS images would be required, significantly higher overlap of the MS images in both the lateral and longitudinal directions would be required to generate geometric-referenced MS data products of the same resolution and accuracy.

Methods of the present disclosure, therefore, allow for a smaller FOV and, in some examples, higher spatial resolution of the MS images taken over a shorter flight path 14 than prior art methods, for example, by allowing for fewer number of passes by the aerial imaging system 26 over a given area of land. The resulting shorter flight path ensures a greater proportion of the PAN and MS images are taken under similar lighting conditions and that less energy in the form of battery power and/or fuel is required to power an aerial vehicle, such as aerial vehicle 30, to survey a given area. By way of non-limiting example, as compared to a base case system that only includes a NFOV camera, such as an MS camera with an AFOV (FP-AFOV and/or L-AFOV) of approximately 30 degrees to 40 degrees, an improved system that includes at least one camera with a wider field of view, such as a PAN camera with an AFOV that is approximately twice as wide, such as approximately 60 degrees to approximately 75 degrees, can result in a 50%-75% reduction in flight path time due to the ability to increase the lateral offset between flight paths (e.g. lateral offset 90, FIG. 9), and in some examples by the ability to also increase the speed the aerial vehicle travels over the ground. Similarly, the square footage of area that can be imaged during a given flight path time can be increased by at least 100% as compared to the base case. As compared to the base case with only cameras with NFOV lenses, in the improved case the resulting offset in the images captured by the NFOV lenses will be less, for example, 40% overlap or less. However, the NFOV images can still be orthorectified by utilizing the WFOV images by applying the teachings of the present disclosure.

In the illustrated example photogrammetry software 1120 includes a PAN-MS translation module 1144 for utilizing the PAN images 1114 and PAN geometric data, such as the PAN EO data 1124 for the processing of the MS images and generating geo-referenced MS data. In one example, the PAN-MS translation module 1144 may utilize the RCAEB module 1118 to co-register one or more bands of the MS images 1112 with the PAN images 1114. For example, if MS images 1112 includes eight sets of MS images from the eight corresponding spectral sensors of the two illustrated MS cameras 200 (four spectral image sensors in each camera), then each of the eight sets of MS images may be co-registered with the PAN images 1114. In some examples where the FOV of the MS cameras 200 is less than the FOV of the PAN camera 100, the co-registration process may involve identifying the PAN image pixels that overlap with the MS pixels and applying a null value or disregarding other PAN pixels for areas of the PAN FOV that are outside of the MS FOV. In some examples where the MS images are resampled to be co-registered with the PAN images, the PAN EO data 1124 may be directly used as the EO data for further photogrammetric processing of the resampled and co-registered MS images. In other examples, the PAN-MS translation module 1144 may then generate the MS EO data 1142, e.g., for each spectral band of each MS camera, from the PAN EO data 1124. Orthorectification module 1130 may then be executed to orthorectify each frame of the MS images 1112 with either the PAN EO data 1124 or the generated MS EO data 1142, the PAN DSM 1128, and MS camera parameters, including MS camera 10 parameters such as lens and sensor parameters accessed from, e.g., camera rig parameters 1108. As noted above, in some examples, a separate DSM does not need to be generated from the MS images and the PAN DSM 1128 may be used for orthorectification of the MS images. Mosaic generation module 1132 and digital elevation module 1126 may be executed to generate a digital elevation model of the MS image data (MS DSM 1140) and a mosaic of the orthorectified MS image data (MS mosaics 1138).

In one example, the PAN-MS translation module 1144 may generate the MS EO data 1142 from the PAN EO data 1124 with a calibration and direct mathematical transformation process. In one example, a calibration and direct mathematical transformation process may include performing a manual calibration by identifying corresponding tie points between MS image frames and PAN image frames and then using the identified tie points to derive rotation and translation transformation for translating each of the six EO parameters of each PAN image frame to an EO parameter for an MS image frame. The translation may include accounting for differences in lens geometry between the PAN camera 100 and each corresponding MS camera 200. In one example the same transformation may be applied to all frames captured by cameras on the same camera rig or separate EO data may be generated for each MS camera. In such an example, the MS images 1112 may not be resampled to be co-registered with the PAN images and instead the MS images 1112 may be processed with the generated MS EO data while in other examples, the MS images may be co-registered with the PAN images as in other examples disclosed herein.

In another example, the PAN-MS translation module 1144 may generate the MS EO data 1142 from the PAN EO data 1124 with an automatic alignment process that is similar to what is performed by the RCAEB module 1118 to derive a PAN EO to MS EO transformation. The translation may include accounting for differences in lens geometry between the PAN camera 100 and each corresponding MS camera 200. In such an example, the MS images 1112 may not be resampled to be co-registered with the PAN images and instead the MS images 1112 may be processed with the generated MS EO data while in other examples, the MS images may be co-registered with the PAN images as in other examples disclosed herein.

In another example, the PAN-MS translation module 1144 may generate the MS EO data 1142 from the PAN EO data 1124 with a hybrid approach that includes a manual calibration and/or a prior alignment of image frames and as a second step perform a refinement for each frame. A second refinement step may be used to account for rolling shutter issues. The translation may include accounting for differences in lens geometry between the PAN camera 100 and each corresponding MS camera 200. In such an example, the MS images 1112 may not be resampled to be co-registered with the PAN images and instead the MS images 1112 may be processed with the generated MS EO data while in other examples, the MS images may be co-registered with the PAN images as in other examples disclosed herein. PAN-MS translation module 1144 may be referred to more generally as a WFOV-NFOV translation module, where WFOV images captured from a WFOV image sensor are utilized for processing other images captured with an image sensor with a narrower field of view using any of the methods described herein.

Computing device 1100 may also include an index module 1150 for calculating one or more indices or other analytical data products from the generated MS data products and storing calculated indices 1152 in the storage device 1106. Index module 1150 may calculate any number of indices known in the art, such as NVDI data 1154 as well as other spectral index parameters, e.g., a first spectral index 1156 and a second spectral index 1158 as appropriate for a given application such as leaf area index (LAI) and leaf chlorophyll concentrations (LCC), among others. Persons having ordinary skill in the art will recognize that the systems and methods disclosed herein may be readily adapted to generate applicable indices and analytical data products for a given application according to, for example, the type of landscape being imaged and the purpose of the analysis.

Data Collection And Processing Methods

Aspects of the disclosure are directed to methods of operating an aerial imaging system, such as aerial imaging system 26 to perform remote sensing of a region of interest. The methods include capturing panchromatic and multispectral image data and processing the image data to assess at least one characteristic of the region of interest, such as a portion of a vegetative landscape.

Figure 12:
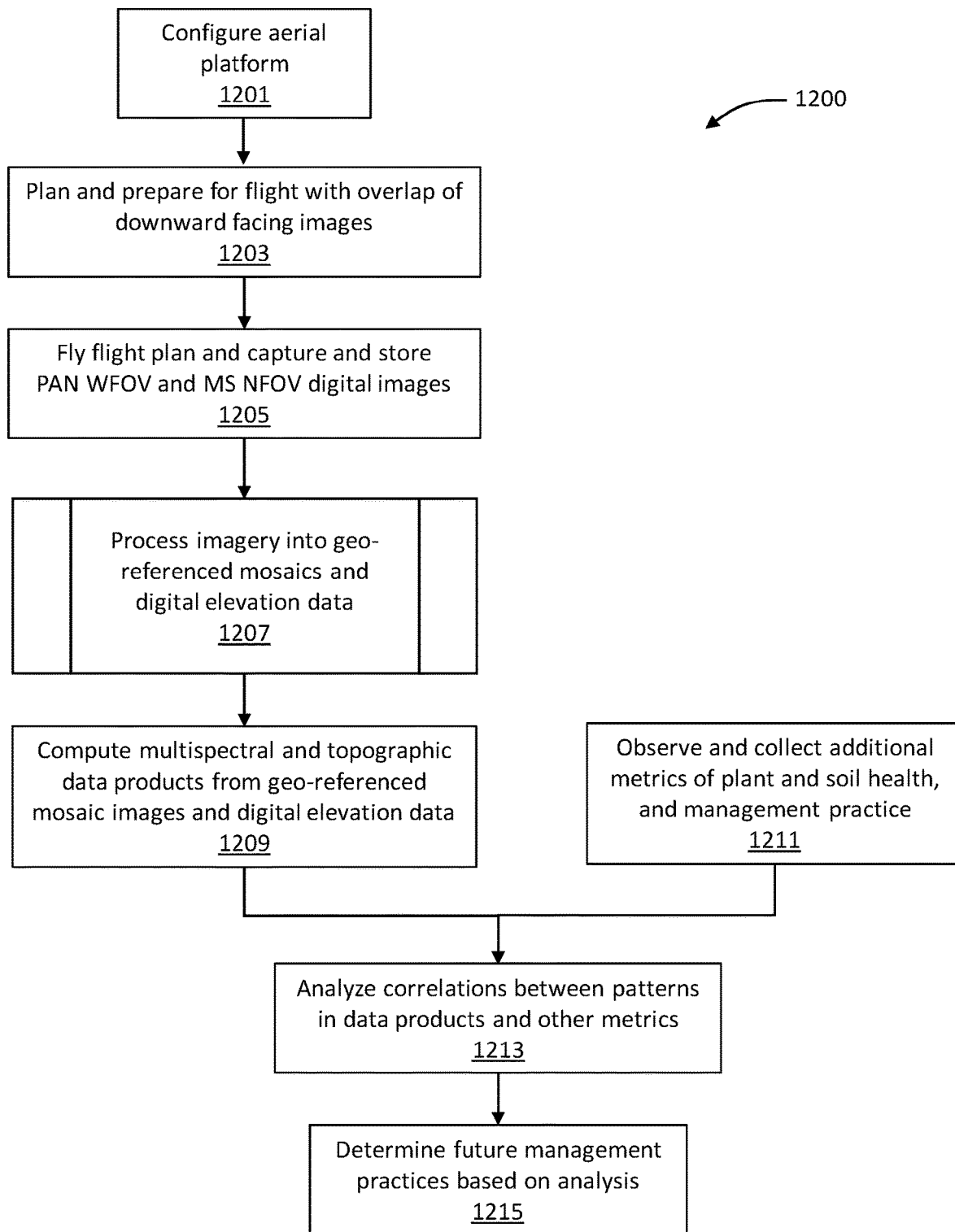
FIG. 12 is a flow diagram of a method of using an imaging system of the present disclosure to capture and analyze spectral sensor data and utilize the data to improve agricultural management practices.

FIG. 12 is a flow chart illustrating an example method 1200 of using a multispectral remote sensing system, such as system 10, for monitoring a landscape, such as for monitoring the development and health of a vegetative landscape. In the illustrated example at block 1201, method 1200 includes configuring an aerial imaging system, such as aerial imaging system 26, for example, by operably attaching a camera rig, such as camera rig 50 to an aerial vehicle, such as aerial vehicle 30, using a stabilizer, such as stabilizer 60. At block 1203, a flight path, such as flight path 14 is planned based on a map of the subject area of a region of interest of a landscape, such as landscape 800. In one example, details of the flight path 14 are established based on flight parameters (such as 3-dimensional waypoints in the sky and speed of segments between waypoints) to capture a series of digital images that, when arranged in a mosaic, will encompass the entire area, balancing ground speed, altitude, and trigger rate to achieve a select overlap of individual captured digital images. In an example, an amount of overlap in the longitudinal overlap 19 of the PAN WFOV digital images is at least approximately 50% and in some examples, at least approximately 60%, and in some examples, at least approximately 70%. In some examples, the amount of lateral overlap 17 of the PAN WFOV digital images is at least approximately 50% and in some examples, at least approximately 60%, and in some examples, at least approximately 70%. Further in an example, the amount of longitudinal overlap 93 of the MS NFOV digital images is less than approximately 50%, and in some examples, less than approximately 40%, and in some examples, less than approximately 30%, and in some examples, less than approximately 20%, and in some examples, less than approximately 10%, and in some examples, less than approximately 5%. Further in an example, the amount of lateral overlap 92 in the MS NFOV digital images is less than approximately 50%, and in some examples, less than approximately 40%, and in some examples, less than approximately 30%, and in some examples, less than approximately 20%, and in some examples, less than approximately 10%, and in some examples, less than approximately 5%. In an example, a flight path is designed and configured to achieve an overlap in PAN or MS images sufficient for performing one or more photogrammetric process and in some examples sufficient to overcome uncontrolled azimuthal and nadir error, due to variability in drone pitch, roll, yaw, gimbal imperfection, etc.

The planning of flight path 14 can include selecting a time of day that is optimum or near optimum for the given imaging application. For example, it may be best to pick a time of day that minimizes off-nadir illumination and bidirectional reflectance effects by triggering exposures only when consistently flying either away from or towards the sun. The time to cover the flight path may also be chosen to avoid substantial changes in lighting during the image capture process. In some examples, block 1203 includes execution of a ground control module, such as ground control module 1102 and accessing camera rig parameters and aerial vehicle parameters such as camera rig parameters 1108 and aerial vehicle parameters 1110.

With continuing reference to FIG. 12, at block 1205, the aerial imaging system 26 is flown over the flight path 14 and PAN WFOV digital images and MS NFOV digital images are captured by the PAN camera 100 and the MS cameras 200, respectively, as described above and also as described in greater detail below. In one example, the PAN WFOV and MS NFOV digital images of the WFOV and NFOV coverage areas 16 and 80 are captured using a frame shutter method wherein an entire image is captured as a single frame and in a single exposure for a set exposure time, and with a slight delay between exposures to allow for the image sensor (FPA) to reset. In another example, a rolling shutter method is employed wherein the image is captured sequentially by rows of pixels in the image sensor rather than all of the pixels rows being exposed at once. The rolling shutter method is suitable for CMOS-based sensors such as in CMOS-based FPAs which can be employed herein. In one example the rolling shutter "rolls" in the direction of the flight path 14, also referred to herein as the longitudinal direction.

At block 1207, the PAN WFOV the MS NFOV digital images are processed into georeferenced mosaics and digital elevation data, such as PAN EO data 1124, PAN DSM data 1128, PAN mosaic 1134, MS EO data 1142, MS DSM data 1140, and MS mosaics 1138, among others, with photogrammetry software, such as photogrammetry software 1120.

With continuing reference to FIG. 12, in block 1209, additional multispectral and topographic data products may be computed from the georeferenced mosaiced images and the digital elevation data, such as one or more indices, such as indices 1152. In block 1211, when utilizing aspects of the present disclosure for soil and agriculture applications, one or more additional agricultural metrics for agricultural features of interest, such as plant health, soil health, and the like may be collected that inform agricultural management practices for the given portion of the landscape 800 being imaged.

In block 1213, the spectral indices generated at block 1209 and the additional agricultural metrics generated at block 1211 may be analyzed to, for example, identify correlations or other patterns which may be used to identify possible causes and effects. For example, variations in foliage can be analyzed across the given landscape as well as across a given plant, across a group or groupings of plants, or within each tree in a group of one or more trees for example. Observations at select wavelengths can be used to identify known causes for such variations.

In block 1215, the analyses and correlations of block 1213 can be used at least in part to establish future agricultural management practices as well as validate existing agricultural management practices. For example, if the analysis shows poor growth of a certain type of crop in one region of the landscape as compared to other regions is due to a lack of irrigation, then the amount and/or frequency of the irrigation can be increased for the problematic region of the landscape. In other example applications outside of agriculture, at least blocks 1211, 1213, and 1215 may be modified according to the particular type of landscape and analysis.

Photogrammetric And Orthomosaic Processing

Figure 13:
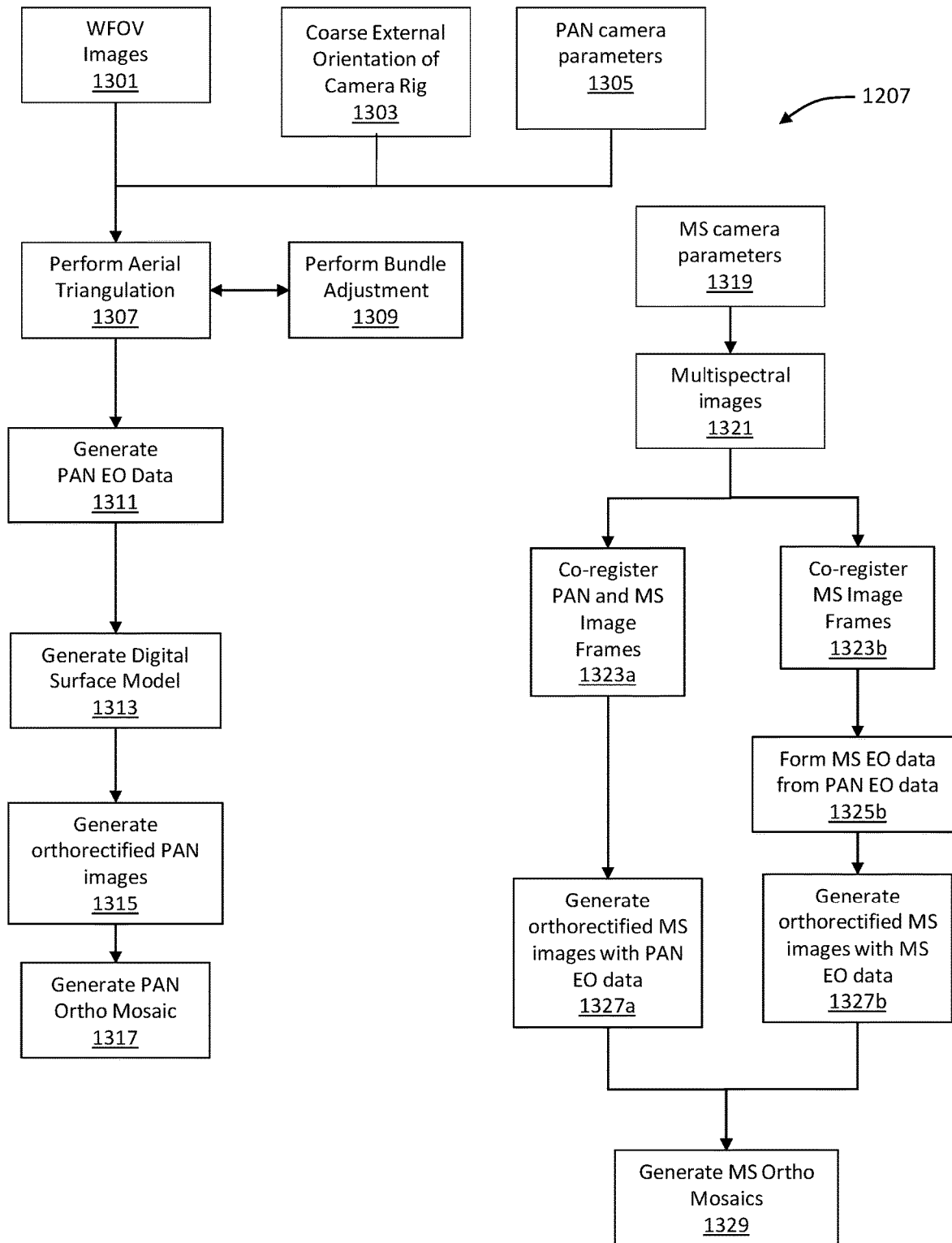
FIG. 13 is a flow diagram of a method of photogrammetric and orthomosaic processing of images.

FIG. 13 is a flow diagram of a method 1300 of one example implementation of block 1207 (FIG. 12)—processing imagery into geo-referenced mosaics and digital elevation data. As used herein, an orthomosaic process or orthomosaicing relates to the formation of the geo-referenced and orthorectified mosaics of digital images. Aspects of the present disclosure also include applying photogrammetry techniques to process overlapping digital images to produce three-dimensional information and in some examples, three dimensional maps of a landscape and to provide elevation data. In an example, geo-referenced mosaic images means mosaic images utilize reference points in the landscape to establish the image locations relative to the landscape.

As discussed above, the methods disclosed herein employ substantial overlap of the PAN WFOV digital images and in some examples, overlap of the MS NFOV digital images. The overlap of the PAN images allows for the geo-referencing step to very high spatial resolution. This high spatial resolution georeferencing is combined with the multispectral data and digital elevation (topographic) data to create a very accurate multispectral map of a landscape, such as landscape 800.

Referring to FIG. 13, at block 1301, PAN WFOV images are accessed or received, for example, PAN images 1114 accessed from storage device 1106. At block 1303, a course external orientation of the camera rig at each frame of the PAN WFOV images is accessed or received, for example, from flight data 1116 and at block 1305 PAN camera parameters are accessed or received, for example, from camera rig parameters 1108. At blocks 1307 and 1309 an aerial triangulation is computed, for example, with aerial triangulation module 1122, to align the overlapping PAN WFOV images with common tie points. In blocks 1307 and 1309, a bundle adjustment is performed iteratively on the PAN WFOV digital images and the external orientations accessed at block 1303 until a sufficiently accurate set of external orientations of the PAN sensor (e.g. PAN EC) data 1124) are produced at block 1311.

In block 1313, the triangulated PAN WFOV digital images and the PAN external orientation data calculated at block 1311 are used to compute a digital surface model (DSM). In an example, block 1313 is performed by digital elevation module 1126. The amount of overlap of the PAN WFOV digital images allows for a high accuracy and spatial resolution for the DSM. As described more below, in some examples, the DSM generated from the PAN images 1114 is used to provide the topographic information (e.g., relative elevation) for each pixel in a MS orthomosaic and a separate DSM does not need to be generated from the MS images.

Once the digital surface model has been created, at block 1315 the PAN WFOV digital images are orthorectified using, for example, orthorectification module 1130. At block 1317, the PAN WFOV orthorectified images are mosaicked using, for example, mosaic generation module 1132 to produce an orthorectified mosaic image of the landscape. In other examples where an orthorectified mosaic of PAN images is not needed, blocks 1315 and 1317 may be omitted.

At block 1319 MS camera parameters are accessed or received, for example, from camera rig parameters 1108 and at block 1321 MS images are accessed or received from, for example, MS images 1112.

Blocks 1323*a* and 1327*a* illustrate a first example method where MS images are co-registered with PAN images and the PAN EO data is utilized for orthorectification of the MS images. Blocks 1323*b*-1327*b* illustrate a second example method that may be performed as an alternative to blocks 1323*a* and 1327*a* where the MS images are not co-registered with the PAN images and MS EO data is calculated from the PAN EO data and used for orthorectification of the MS images.

Referring to the first example method (blocks 1323*a* and 1327*a*), at block 1323*a*, the MS images and PAN images may be aligned or co-registered, using, for example, the PAN-MS translation module 1144 and the PAN and MS camera geometries. In an example, block 1323*a* results in a new set of aligned MS NFOV digital images wherein the pixels thereof are precisely aligned with the central pixels of corresponding PAN WFOV digital images. Because, in some examples, the PAN WFOV digital images have a wider field of view than the MS NFOV digital images, the aligned pixels of the MS NFOV digital images only cover a portion, such as a central portion of the corresponding PAN WFOV digital images. In some embodiments, the pixels of both sets of digital images can be sampled and correlated with each other to determine the alignment transformation. In some embodiments, only one of the MS bands, e.g., the green light band, may be used as the master band from the set of MS NFOV digital images to correlate to the set of PAN WFOV digital images. At block 1327*a*, because the MS images have been resampled to be co-registered with the PAN images, the PAN EO data calculated at block 1311 can be directly used as the EO data for orthorectification of the MS images.

Referring to the alternative example (blocks 1323*b*-1327*b*), in block 1323*b* the MS images are not co-registered with the PAN images, however, in some examples, each band of MS images, for example in a given MS camera, or all MS cameras, may be co-registered so that a single set of EO data can be used to orthorectify multiple bands of MS images.

At block 1325*b*, because the MS images were not resampled to be co-registered with the PAN images, the PAN EO data may not be directly used for the orthorectification of the MS images and instead MS EO data may be formed by translating the PAN EO data previously obtained at block 1311 using any of the methodologies disclosed herein and the generated MS EO data may be stored, e.g., as MS EO data 1142. Importantly, block 1325*b* can be performed by directly translating the PAN EO data previously calculated at block 1311 because the PAN camera 100 and MS cameras 200 are located on the same aerial platform and both the PAN and MS sets of images were captured at substantially the same time during the same flight. Thus, the aerial triangulation and bundle adjustment steps (blocks 1307 and 1308) that were performed on the WFOV PAN images do not need to be performed again with the MS images to determine the MS EO data. Similarly, in block 1327*a*, the PAN EO data can be directly used for orthorectification of the MS images. Both options provide a significant advantage over prior art approaches where blocks 1307, 1309, and 1311 would need to be separately performed on the MS images, which would require significantly greater overlap of the MS image frames which would increase the required flight path length and time because smaller flight path leg lateral offsets 90 (FIG. 9) would be required to achieve the requisite lateral offset 92 and a slower flight speed would be required to allow for a sufficient number of image frames to be captured to achieve the requisite overlap in the flight path direction of the MS images.

At block 1327*a*, with the PAN EO data, MS camera parameters (block 1319) and the previously generated DSM or corresponding elevation point cloud (generated from the PAN images at block 1313), an orthorectification process using, for example, orthorectification module 1130, may be performed to modify one or more of the MS images to form orthorectified MS images. The steps performed in block 1327*b* are substantially the same as block 1327*a* except that the MS EO data calculated at block 1325*b* is used for orthorectification rather than the PAN EO data. At block 1329 the orthorectified MS images may be combined into an MS ortho mosaic of the landscape.

The use of the WFOV images for the initial orthorectification process has the advantage of providing for more side-to-side overlap for use in the aerial triangulation and bundle adjustment processes as well as providing more views of the same spot on the ground from different orientations. This allows the digital surface generation process and the orthorectification process to be more accurate than if only the set of MS NFOV digital images were used. The high spatial resolution of the surface topography from the digital surface model is combined with the multispectral image data from the MS NFOV images to create the MS NFOV multispectral orthorectified mosaic image of the landscape.

Figure 14:
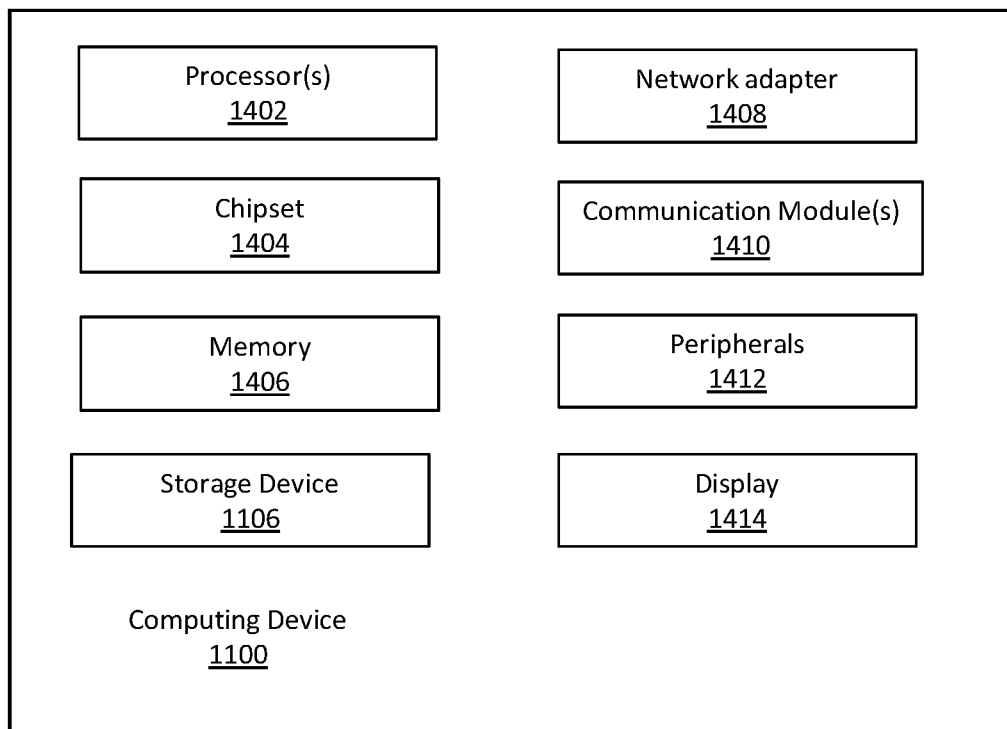
FIG. 14 is a functional block diagram of certain components of the computing device of FIG. 11.

FIG. 14 is a block diagram illustrating physical components of one example implementation of computing device 1100 and storage device 1106. Illustrated are at least one processor 1402 coupled to a chipset 1404. Also coupled to the chipset 1404 are a memory 1406, storage device 1106 (see also FIG. 11), a network adapter 1408, and communication module(s) 1410. Peripherals 1412 and display 1414 are coupled to the computing device 1100. In another embodiment, the memory 1406 is coupled directly to the processor 1402.

Storage device 1106 may be any non-transitory computer-readable storage medium, such as a hard drive, compact disk read-only memory (CD-ROM), DVD, or a solid-state memory device. The memory 1406 holds instructions and data used by the processor 1402. Network adapter 1408 couples the computing device 1100 to a local or wide area network and communication modules 1410 provide additional channels for wired or wireless communication.

As is known in the art, computing device 1100 can have different and/or other components than those shown in FIG. 14. In addition, computing device 1100 can lack certain illustrated components. In some examples the storage device 1106 can be local and/or remote from computing device 1100, such as a separate storage device, cold storage device, a storage area network (SAN), or a cloud-based storage architecture.

As is known in the art, computing device 1100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1106, loaded into the memory 1406, and executed by the processor 1402.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

While FIGS. 11 and 14 illustrate a single computing device 1100 and storage device 1106, it will be understood that the functionality and storage provided by the computing device 1100 and storage device 1106 may be implemented in any number of computing devices and storage devices. By way of example, a first computing device 1100 may be used to execute ground control software 1102 and one or more other computing devices 1100 may be used to execute other software modules disclosed herein.

Computing device 1100 may be configured to communicate with other computing devices of system 10 and aerial imaging system 26 over one or more networks which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). Those skilled in the art will recognize that encryption using other suitable techniques will be appropriate for various applications based on the nature of the network.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A non-transitory computer-readable storage medium containing machine-executable instructions for performing a method of generating geo-referenced spectral images of a landscape from a first plurality of images captured by a first image sensor of an aerial platform and a plurality of spectral images captured by a multispectral (MS) image sensor of the aerial platform, wherein the method comprising:
performing an aerial triangulation and bundle adjustment process on the first plurality of images to determine first image sensor external orientation (EO) data, the first image sensor EO data defining the EO of the first image sensor when each of the first plurality of images was captured by the first image sensor;
generating a digital elevation product from the plurality of first images and the first image sensor EO data; and
orthorectifying at least one of the plurality of spectral images according to the digital elevation product.

2. The non-transitory computer-readable storage medium of claim 1, wherein the method further comprises:
co-registering the spectral images with corresponding ones of the first plurality of images;
wherein the step of orthorectifying includes orthorectifying at least one of the plurality of spectral images according to the digital elevation product and the first image sensor EO data.

3. The non-transitory computer-readable storage medium of claim 2, wherein the step of co-registering includes:
identifying, in the first plurality of images, a plurality of tie points;
identifying, in corresponding ones of the plurality of spectral images, pixels that correspond to the identified plurality of tie points; and
resampling one or more of the plurality of spectral images according to the tie points to co-register each of the plurality of spectral images with corresponding ones of the first plurality of images.

4. The non-transitory computer-readable storage medium of claim 1, wherein the method further comprises:
calculating MS image sensor EO data from the first image sensor EO data;
wherein the step of orthorectifying includes orthorectifying at least one of the plurality of spectral images according to the digital elevation product and the MS image sensor EO data.

5. The non-transitory computer-readable storage medium of claim 4, wherein the step of calculating MS image sensor EO data from the first image sensor EO data includes translating the first image sensor EO data to the MS image sensor EO data according to one or more camera rig parameters.

6. The non-transitory computer-readable storage medium of claim 5, wherein the camera rig parameters include at least one of internal orientation (IO) data for the first image sensor, IO data for the MS image sensor, and relative spatial positioning information for the first image sensor and MS image sensor on the aerial platform.

7. The non-transitory computer-readable storage medium of claim 1, wherein the MS image sensor is configured to simultaneously capture a plurality of spectral images at a plurality of corresponding spectral bands, the plurality of MS images including a plurality of spectral images at each of the spectral bands, and the method further comprising co-registering the images of the plurality of spectral bands.

8. The non-transitory computer-readable storage medium of claim 1, wherein the first plurality of images and the plurality of spectral images were sequentially captured during a flight path of the aerial platform over the landscape by sequentially triggering the first image sensor and MS image sensor at the same time.

9. The non-transitory computer-readable storage medium of claim 1, wherein the first plurality of images overlap by at least 50% in at least one direction and wherein the plurality of spectral images overlap by less than 40% in at least one direction.

10. The non-transitory computer-readable storage medium of claim 1, wherein the first plurality of images overlap by at least 70% in a lateral direction and the plurality of spectral images overlap by less than 40% in the lateral direction, wherein the lateral direction is orthogonal to a flight path direction of the aerial platform when the first plurality of images and plurality of spectral images were captured.

11. The non-transitory computer-readable storage medium of claim 1, wherein the digital elevation product is a digital surface model.

12. The non-transitory computer-readable storage medium of claim 1, wherein the method further comprises generating a mosaic of the orthorectified spectral images.

13. The non-transitory computer-readable storage medium of claim 1, wherein the first image sensor is a panchromatic camera and the MS image sensor includes at least three spectral bands.

14. The non-transitory computer-readable storage medium of claim 1, wherein the landscape is a terrestrial landscape including one or more of a vegetative landscape, an agricultural landscape, an ocean, a lake, an estuary, a stream, a river, an inland sea, a wetland, a coastal region, an urban landscape, a suburban landscape, a rural landscape, an industrial landscape, a glacier, or an ice sheet or an extraterrestrial landscape.

15. A non-transitory computer-readable storage medium containing machine-executable instructions for performing a method of generating a flight plan that includes a flight path and a series of image capture locations for an aerial system, wherein the aerial imaging system includes a first downward-looking camera that is a panchromatic camera and at least one second downward-looking camera that includes a multispectral camera, wherein the field of view of the first camera has a cross-sectional area between at least 50% greater than and at least 100% greater than a cross-section area of the field of view of the second camera, wherein the field of view of the second camera is centered within the field of view of the first camera, and wherein the first and second cameras are triggered at the same time and have the same frame rate such that multispectral digital images of a given portion of the landscape taken by the second (multispectral) camera each reside within a panchromatic digital image of the corresponding portion of the landscape taken by the first camera, wherein the method of generating the flight plan comprises:
 ensuring a sufficient number of images are captured so that a continuous map of the landscape can be generated and so that the image capture locations result in an overlap of adjacent images, including a longitudinal overlap in the flight path direction and a lateral overlap in the lateral direction; wherein:
 the lateral overlap of adjacent panchromatic images is in the range of 30% to 90% and the lateral overlap of adjacent multispectral images is in the range of 20% to 50%; and
 the longitudinal overlap of adjacent panchromatic images is in the range of 30% to greater than 70% and the longitudinal overlap of adjacent multispectral images is in the range of 20% to less than 50%.

16. The non-transitory computer-readable storage medium of claim 15, wherein the specified longitudinal overlap of the series of images may be obtained by varying the frame rate or the rate at which the cameras are triggered to capture an image.

17. The non-transitory computer-readable storage medium of claim 15, wherein the specified longitudinal overlap of the series of images may be obtained by varying the speed of the aerial vehicle.

18. The non-transitory computer-readable storage medium of claim 15, wherein the at least one second camera includes a thermal infrared camera.

19. The non-transitory computer-readable storage medium of claim 15, wherein the machine-executable instructions for performing the method of generating a flight plan may be executed by a ground control station or a ground control module.

20. The non-transitory computer-readable storage medium of claim 15, wherein the machine-executable instructions are executable by aerial vehicle electronics.

* * * * *